United States Patent
Madsen et al.

(10) Patent No.: US 12,222,235 B2
(45) Date of Patent: Feb. 11, 2025

(54) AUTOMATED SPLITTING OF A FLUID

(71) Applicant: Fenwal, Inc., Lake Zurich, IL (US)

(72) Inventors: James Madsen, Chicago, IL (US); Kyungyoon Min, Kildeer, IL (US)

(73) Assignee: Fenwal, Inc., Lake Zurich, IL (US)

( * ) Notice: Subject to any disclaimer, the term of this patent is extended or adjusted under 35 U.S.C. 154(b) by 245 days.

(21) Appl. No.: 17/627,245

(22) PCT Filed: Jul. 16, 2020

(86) PCT No.: PCT/US2020/042235
§ 371 (c)(1),
(2) Date: Jan. 14, 2022

(87) PCT Pub. No.: WO2021/011721
PCT Pub. Date: Jan. 21, 2021

(65) Prior Publication Data
US 2022/0260408 A1    Aug. 18, 2022

Related U.S. Application Data

(60) Provisional application No. 63/043,496, filed on Jun. 24, 2020, provisional application No. 63/043,402, (Continued)

(51) Int. Cl.
*G01G 13/26* (2006.01)
*G01G 13/00* (2006.01)

(52) U.S. Cl.
CPC ........... *G01G 13/26* (2013.01); *G01G 13/003* (2013.01)

(58) Field of Classification Search
CPC ......... G01G 13/26; G01G 19/18; G01G 23/16
See application file for complete search history.

(56) References Cited

U.S. PATENT DOCUMENTS

| | | |
|---|---|---|
| 5,762,291 A | 6/1998 | Hollis et al. |
| 6,238,366 B1 | 5/2001 | Savage |
| | (Continued) | |

FOREIGN PATENT DOCUMENTS

| | | |
|---|---|---|
| EP | 3238761 | 11/2017 |
| EP | 3329947 | 6/2018 |

OTHER PUBLICATIONS

International Searching Authority. "International Search Report and Written Opinion", mailed on Oct. 21, 2020 in connection with international application No. PCT/US2020/042235, 13 pages.

*Primary Examiner* — Paul J Gray
(74) *Attorney, Agent, or Firm* — Cook Alex Ltd.

(57) ABSTRACT

A system for splitting a fluid includes a source support configured to support a source container of a fluid flow circuit and at least one satellite support, with each satellite support configured to support a different satellite container fluidly connected to the source container. A weight scale is associated with each of the supports. The system also includes a clamp system and a controller. The controller is configured to control each weight scale to measure a combined weight of the container and the contents of the container supported by the support associated with the weight scale. The controller is configured to control the clamp system to selectively allow and prevent fluid flow from the source container to each satellite container based at least in part upon the weights measured by each weight scale. Fluid flow continues until the contents of each container have reached a target volume.

14 Claims, 14 Drawing Sheets

Related U.S. Application Data filed on Jun. 24, 2020, provisional application No. 62/983,001, filed on Feb. 28, 2020, provisional application No. 62/946,518, filed on Dec. 11, 2019, provisional application No. 62/875,027, filed on Jul. 17, 2019.

(56) References Cited

U.S. PATENT DOCUMENTS

| | | |
|---|---|---|
| 6,251,284 B1 | 6/2001 | Bischof |
| 6,270,673 B1 | 8/2001 | Belt et al. |
| 6,284,142 B1 | 9/2001 | Muller |
| 6,294,094 B1 | 9/2001 | Muller et al. |
| 6,348,156 B1 | 2/2002 | Vishnoi et al. |
| 6,994,790 B2 | 2/2006 | Corbin, III et al. |
| 7,207,966 B2 | 4/2007 | Savare et al. |
| 7,247,146 B2 | 7/2007 | Tonelli et al. |
| 7,314,554 B2 | 1/2008 | Delnevo et al. |
| 7,503,901 B2 | 3/2009 | Behague et al. |
| 7,909,208 B2 | 3/2011 | Skordas |
| 8,439,889 B2 | 5/2013 | Sano |
| 8,454,548 B2 | 6/2013 | Ohashi et al. |
| 8,702,637 B2 | 4/2014 | Pages et al. |
| 8,796,017 B2 | 8/2014 | Suzuki et al. |
| 8,993,321 B2 | 3/2015 | Suzuki et al. |
| 9,199,070 B2 | 12/2015 | Wegener et al. |
| 9,302,042 B2 | 4/2016 | Pages |
| 9,550,588 B2 | 1/2017 | Mueller et al. |
| 9,707,326 B2 | 7/2017 | Muller et al. |
| 9,931,452 B2 | 4/2018 | Pouchoulin |
| 9,943,636 B2 | 4/2018 | Fontanazzi et al. |
| 10,002,190 B2 | 6/2018 | West |
| 10,016,551 B2 | 7/2018 | Hersenius |
| 10,040,247 B2 | 8/2018 | Schwalm et al. |
| 10,052,423 B2 | 8/2018 | Pouchoulin |
| 10,052,425 B2 | 8/2018 | OMahony |
| 10,258,726 B2 | 4/2019 | Pouchoulin |
| 10,314,764 B2 | 6/2019 | Lopez et al. |
| 10,398,827 B2 | 9/2019 | Pouchoulin |
| 2002/0091057 A1 | 7/2002 | Westberg et al. |
| 2013/0248426 A1 | 9/2013 | Pouchoulin |
| 2015/0034536 A1 | 2/2015 | Rada et al. |
| 2016/0038665 A1 | 2/2016 | Schaefer et al. |
| 2016/0220748 A1 | 8/2016 | Pouchoulin |
| 2017/0147166 A1 | 5/2017 | Schaefer et al. |
| 2017/0209637 A1 | 7/2017 | Schaefer et al. |
| 2018/0078454 A1 | 3/2018 | Hosoe et al. |
| 2018/0155070 A1* | 6/2018 | Min ............... A61J 1/2003 |
| 2019/0134290 A1 | 5/2019 | Pouchoulin et al. |
| 2020/0360604 A1* | 11/2020 | Kolko ............... G01G 3/14 |
| 2021/0023283 A1 | 1/2021 | Court et al. |

* cited by examiner

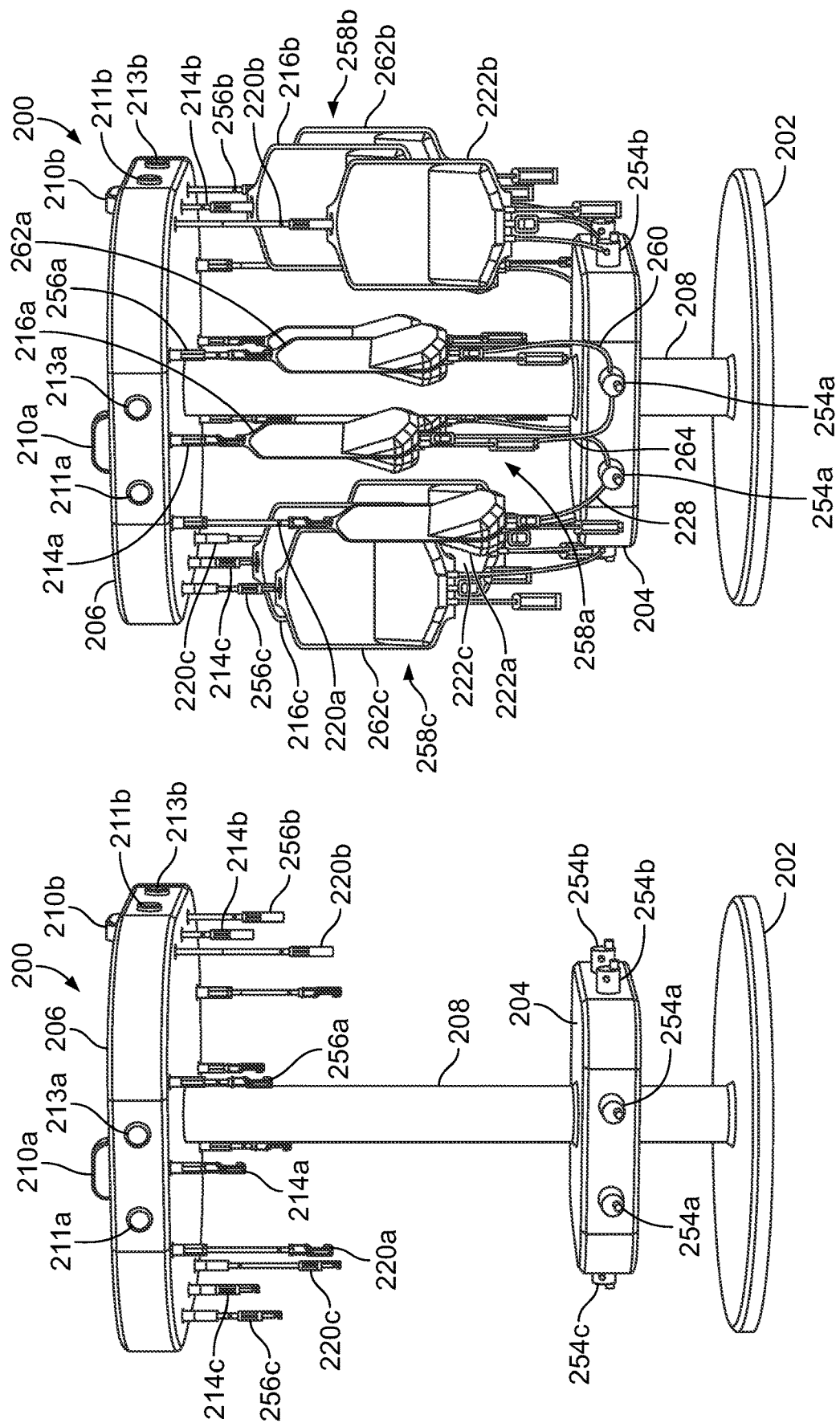

AUTOMATED SPLITTING OF A FLUID

RELATED APPLICATIONS

This application claims the benefit of U.S. Provisional Application Ser. No. 62/875,027, filed on Jul. 17, 2019; U.S. Provisional Application Ser. No. 62/946,518 filed on Dec. 11, 2019; U.S. Provisional Application Ser. No. 62/983,001 filed on Feb. 28, 2020; U.S. Provisional Application Ser. No. 63/043,402 filed on Jun. 24, 2020; and U.S. Provisional Application Ser. No. 63/043,496 filed on Jun. 24, 2020, the disclosures of which are hereby incorporated by reference in their entirety.

DESCRIPTION

Technical Field

The present disclosure relates to automated splitting of a fluid. More particularly, the present disclosure relates to apparatus and methods for splitting a high volume fluid into two or more parts based at least in part upon weight.

BACKGROUND

It is well known to separate blood into its constituents, including separating and collecting a platelet product. A single apheresis platelet donation unit contains approximately $3.0 \times 10^{11}$ platelets suspended in a volume of approximately 200-400 ml of plasma, though a single apheresis procedure may produce a platelet product having a much greater volume, such as approximately $9.6 \times 10^{11}$ platelets suspended in a volume of approximately 700 ml of plasma. In such a scenario, it is typical to split the high volume platelet product into separate amounts each having a volume within the range of what is acceptable for a single unit, with a high volume platelet product typically being split into either two or three units having approximately the same volumes.

The high volume platelet product is conventionally split into individual units according to a manual approach. For example, a platelet product is collected in a collection container of a fluid flow circuit also having at least one secondary container. The fluid flow circuit is weighed to determine the tare weight of the empty containers and the weight of the platelet product. The weight of each container at the end of the procedure (i.e., when a unit of platelets is contained in each) is then calculated by hand. An amount of the high volume platelet product is then flowed out of the collection container and into the secondary container(s) by hand until the volume of platelet product contained by each appears to the technician to be approximately equal. The containers are then weighed to determine whether the volume of each is within the range of what is acceptable for a single unit. If not, the technician repeatedly flows fluid from one container to another until determining that each container contains an appropriate volume of the platelet product. At that time, the containers are typically sealed and separated from each other for storage or use of each as a single unit of platelets.

This manual approach to splitting a high volume platelet product lends itself to errors in splitting the product into equal volumes. Additionally, due to the limitations of existing manual splitting methods, platelet products having $3.0\text{-}6.4 \times 10^{11}$ platelets are considered to be a single unit, with platelet products having $6.5\text{-}9.4 \times 10^{11}$ platelets being considered two units, and platelet products having $9.5\text{-}14.1 \times 10^{11}$ platelets being considered three units.

SUMMARY

There are several aspects of the present subject matter which may be embodied separately or together in the devices, systems, and methods described and/or claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto or later amended.

In one aspect, a system for splitting a fluid includes a source support configured to support a source container of a fluid flow circuit. A satellite support is configured to support a satellite container of the fluid flow circuit fluidly connected to the source container. A weight scale associated with each of the supports. The system further includes a clamp system and a controller. The controller is configured to control each weight scale to measure a combined weight of the container and the contents of the container supported by the support associated with the weight scale. The controller controls the clamp system to selectively allow and prevent fluid flow from the source container to the satellite container based at least in part upon the combined weight measured by each weight scale.

In another aspect, a method of splitting a fluid includes flowing a fluid from a source container of a fluid flow circuit to a satellite container of the fluid flow circuit. A combined weight is measured for each container and the contents of the container. A clamp system is automatically controlled to selectively allow and prevent fluid flow from the source container to the satellite container based at least in part upon the combined weights for each container and the contents of the container.

In another aspect, a system for supporting a fluid container includes a frame, a container support member configured to engage and support a fluid container, and a position adjustment assembly. The position adjustment assembly associates the container support member to the frame and is configured to allow for adjustment of a position of the container support member with respect to the frame.

In another aspect, a system for supporting a fluid container comprises a source support, which is configured to support a source container of a fluid flow circuit, and at least one satellite support. Each satellite support is configured to support a different satellite container of the fluid flow circuit and each satellite container is fluidly connected to the source container. The system also includes a weight scale associated with each of the supports, a clamp system, and a controller. The controller is configured to control each weight scale to measure an initial combined weight of the container and the contents of the container supported by the support associated with the weight scale. The controller is also configured to assign a target weight, based at least in part on the combined weights, to each container. The controller also is configured to, for each satellite container, control the clamp system to allow fluid flow from the source container to the satellite container until a current combined weight measured by the weight scale associated with the satellite support supporting the satellite container is less than and within a predetermined percentage of the target weight for the satellite container. The controller also is configured to, for each satellite container, control the clamp system to prevent fluid flow from the source container to the satellite container when the current combined weight measured by the weight scale associated with the satellite support supporting the satellite container is less than and within a predetermined percentage of the target weight for the satellite container. The controller is also configured to determine, for each satellite container, a fluid flow rate of fluid from the source container to the satellite container upon the clamp system being controlled to allow fluid flow from the source container to the satellite container, along with determining a time based at least in part on the fluid flow rate and a lag time of the clamp system. The controller is also configured to, for each satellite container, control the clamp system to allow fluid flow from the source container to the satellite container for said time and then control the clamp system to prevent fluid flow from the source container to the satellite container so as to arrive within a predetermined amount of the target weight for the satellite container.

In yet another aspect, a method is provided for splitting a fluid in a fluid flow circuit including a source container and at least one satellite container fluidly connected to the source container. The method includes measuring an initial combined weight for each container and the contents of the container and assigning a target weight, based at least in part on the initial combined weights, to each container. For each satellite container, fluid flow is allowed from the source container to the satellite container until a current combined weight of the satellite container and the contents of the satellite container is less than and within a predetermined percentage of the target weight for the satellite container. Fluid flow from the source container to the satellite container is prevented when the current combined weight of the satellite container and the contents of the satellite container is less than and within a predetermined percentage of the target weight for the satellite container. A fluid flow rate of fluid from the source container to the satellite container upon fluid flow from the source container to the satellite container being allowed is then determined, along with a time to allow fluid flow from the source container to the satellite container, with the time being based at least in part on the fluid flow rate and a lag time. Fluid flow from the source container to the satellite container is allowed for said time and then prevented so as to arrive within a predetermined amount of the target weight for the satellite container.

In another aspect, a system for splitting a fluid includes a source support configured to support a source container of a fluid flow circuit and a source weight scale associated with the source support. A satellite support includes a clamp configured to receive a portion of a conduit fluidly connecting a satellite container of the fluid flow circuit to the source container and a satellite weight scale associated with the clamp. The system further includes a controller. The controller is configured to control each weight scale to measure a combined weight of the container and the contents of the container supported by the support associated with the weight scale. The controller controls the clamp to selectively allow and prevent fluid flow from the source container to the satellite container based at least in part upon the combined weight measured by each weight scale.

In yet another aspect, a method of splitting a fluid includes flowing a fluid from a source container of a fluid flow circuit to a satellite container of the fluid flow circuit via a conduit received by a clamp of a satellite support. A combined weight for each container and the contents of the container is measured, with the clamp being automatically controlled to selectively allow and prevent fluid flow from the source container to the satellite container based at least in part upon the combined weights for each container and the contents of the container. The combined weight for the satellite container and the contents of the satellite container is measured using a satellite weight scale associated with the clamp.

In still another aspect, a container support is provided for supporting a container including a conduit. The container support includes a weight scale and a clamp, with the clamp being configured to receive a portion of a conduit. The clamp is movable between an open condition allowing fluid flow through the conduit and a closed condition in which the conduit is occluded, with the weight scale being configured to measure a deflection of the clamp when the clamp is in the closed condition to measure a combined weight of the container and the contents of the container.

In another aspect, a fluid-splitting station includes a base, a central column extending upwardly from the base, a lower support frame extending outwardly from the central column, an upper support frame extending outwardly from the central column, and a plurality of systems for splitting a fluid, each system configured to accommodate a different fluid flow circuit. Each system for splitting a fluid includes a source support associated with the upper support frame and configured to support a source container of the associated fluid flow circuit, a satellite support associated with the upper support frame and configured to support a satellite container of the associated fluid flow circuit fluidly connected to the source container of the associated fluid flow circuit, a weight scale associated with each of the supports, and a clamp system associated with the lower support frame. The system further includes a controller. The controller is configured to control each weight scale to measure a combined weight of the container and the contents of the container supported by the support associated with the weight scale, and control the clamp system to selectively allow and prevent fluid flow from the source container to the satellite container based at least in part upon the combined weight measured by each weight scale.

These and other aspects of the present subject matter are set forth in the following detailed description of the accompanying drawings.

BRIEF DESCRIPTION OF THE DRAWINGS

FIG. 22 is a perspective view of an exemplary embodiment of a fluid-splitting station, according to an aspect of the present disclosure; and FIG. 23 is a perspective view of the fluid-splitting station of FIG. 22, with a plurality of fluid flow circuits mounted thereon.

DETAILED DESCRIPTION OF THE ILLUSTRATED EMBODIMENTS

The embodiments disclosed herein are for the purpose of providing an exemplary description of the present subject matter. They are, however, only exemplary and not exclusive, and the present subject matter may be embodied in various forms. Therefore, specific details disclosed herein are not to be interpreted as limiting the subject matter as defined in the accompanying claims.

Figure 1:
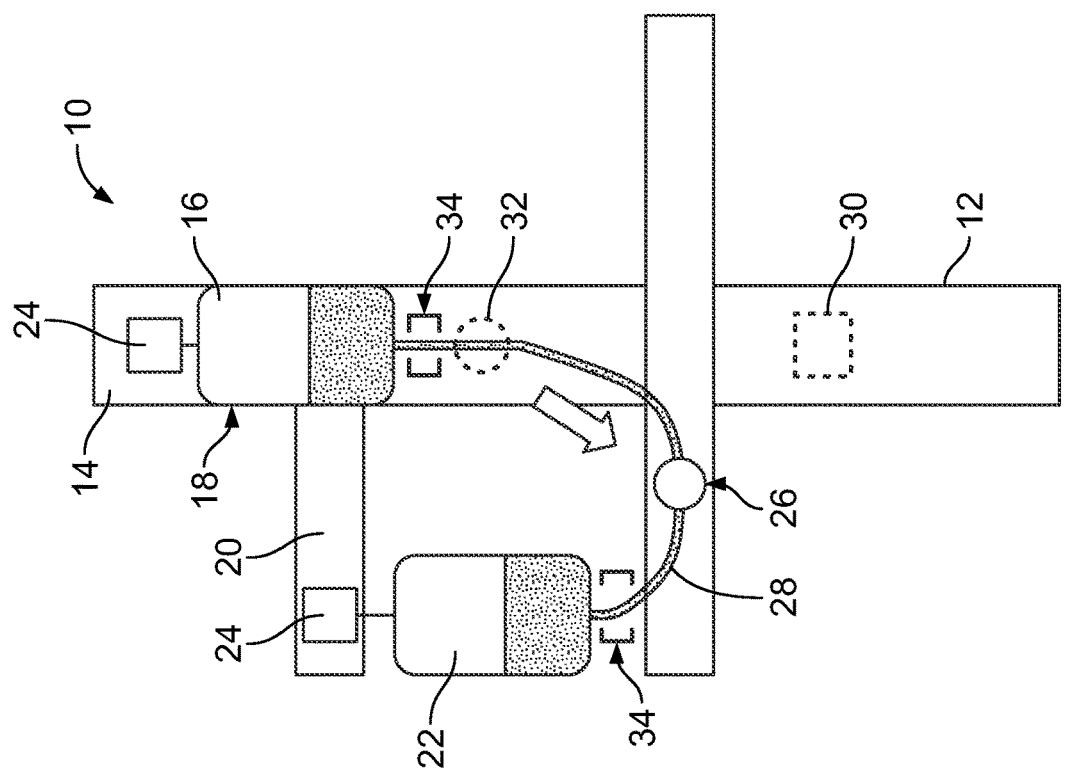
FIG. 1 is a schematic view of an exemplary embodiment of a system for splitting a fluid into two amounts, according to an aspect of the present disclosure.

FIG. 1 depicts an exemplary system 10 for splitting a fluid into two amounts. A system 10 of the type shown in FIG. 1 may be particularly advantageous for splitting a high volume platelet product into two amounts, but it should be understood that the system 10 is not limited to use with any particular fluid.

The illustrated system 10 includes a frame 12 (at least partially formed of a metallic or rigid material in one embodiment) having a source support 14 configured to support a source container 16 of a fluid flow circuit 18. The system 10 is configured as a durable, reusable device, while the fluid flow circuit 18 is typically disposable and configured as a single-use item. However, it is within the scope of the present disclosure for the fluid flow circuit 18 to be configured as a reusable item.

The particular configuration of the source support 14 may vary without departing from the scope of the present disclosure, and may depend upon the nature of the source container 16 that it is intended to support (with the configuration of the source container 16 also being subject to variation without departing from the scope of the present disclosure). For example, in one embodiment, the source container 16 is configured as a flexible bag having an upper opening or aperture. In this case, the source support 14 may include or be configured as a hook or hanger, which includes a portion that extends into and through the upper opening or aperture of the source container 16 to support and suspend the source container 16 at some elevation. In other embodiments, the source support 14 may be differently configured, such as being configured as a horizontal surface onto which the source container 16 may be placed.

The frame 12 further includes a satellite support 20 configured to support a satellite container 22 of the fluid flow circuit 18. The satellite support 20 may be similarly configured to the source support 14 or may be differently configured. Similarly, the satellite container 22 may be similarly configured to the source container 16 or may be differently configured.

Each support 14, 20 has a weight scale 24 associated with it. In the illustrated embodiment, the weight scales 24 are shown as being separate from each other, but it should be understood that they may be associated in some manner as parts of a weighting system or assembly. The weight scales 24 may be similarly or differently configured. Regardless of the particular configuration, each weight scale 24 is configured to measure a combined weight of the container that it is supporting (i.e., the tare weight) and the contents of that container. By knowing the weight of the empty container and the combined weight, the weight of any fluid in the container may be calculated by subtracting the tare weight from the combined weight.

The system 10 also includes a clamp system 26. The satellite container 22 is fluidly connected to the source container 16 by a conduit 28 (e.g., a tube), with the conduit 28 being placed into association with the clamp system 26 when the fluid flow circuit 18 is mounted to the frame 12. The clamp system 26, which may be variously configured without departing from the scope of the present disclosure, is configured to selectively allow and prevent fluid flow between the source container 16 and the satellite container 22. In one embodiment, the clamp system 26 includes one or more clamps or valves configured to be automatically (i.e., non-manually) moved between closed and open conditions. In the open condition, the clamp or valve allows fluid flow through the conduit 28. In the closed condition, the clamp or valve prevents fluid flow through the conduit 28. The manner in which the clamp or valve prevents fluid flow through the conduit 28 may vary depending on the configurations of the clamp or valve and the conduit 28. For example, in one embodiment, the conduit 28 is configured as a flexible tube, with the clamp or valve configured as a pinch valve, which may squeeze the conduit 28 to close it, thereby preventing fluid flow through the conduit 28. If the conduit 28 is differently configured (e.g., as a rigid tube), the clamp system 26 may be differently configured (e.g., as a ball valve) to selectively allow and prevent fluid flow through the conduit 28.

The weight scales 24 and the clamp system 26 communicate with a controller 30. The controller 30 carries out process control and monitoring functions for the system 10. The controller 30 comprises a main processing unit (MPU), which can comprise, e.g., a PENTIUM® type microprocessor made by Intel Corporation, although other types of conventional microprocessors can be used. In the illustrated embodiment, the controller 30 is incorporated into the frame 12, but it should be understood that the controller 30 may be incorporated into a separate component of the system 10, such as a computer that is associated with the weight scales 24 and the clamp system 26 by a wired or wireless connection.

The controller 30 receives data or signals from the weight scales 24 to determine the weight of the fluid in each container 16, 22 throughout the course of a fluid splitting procedure, as the weight of the fluid in each container will change during a procedure due to fluid being conveyed from one of the containers to the other (as will be described in greater detail). Based on the weight of the fluid in each container 16, 22, the controller 30 controls the clamp system 26 to allow or prevent fluid flow through the conduit 28 at any particular time, as appropriate to place the targeted amounts of fluid in each container 16, 22 at the end of the procedure.

In an exemplary procedure using the system 10 of FIG. 1, the fluid flow circuit 18 is mounted to the frame 12, with the source container 16 supported by the source support 14 and the satellite container 22 supported by the satellite support 20. The containers 16 and 22 may be initially empty to allow for the weight scales 24 and the controller 30 to determine the tare weight of each. Alternatively, the tare weights of the containers 16 and 22 may be otherwise determined (e.g., by weighing them using a separate weighting system), with the tare weights being provided to the controller 30.

Regardless of how the tare weights of the containers 16 and 22 are determined, once they are known to the controller 30, the fluid flow circuit 18 is mounted to the frame 12, with the source container 16 supported by the source support 14 and at least partially filled with a fluid, the satellite container 22 supported by the satellite support 20, and a portion of the conduit 28 received by the clamp system 26. It is within the scope of the present disclosure for an amount of fluid to be initially contained in each container 16, 22 or for the satellite container 22 to contain an amount of fluid while the source container 16 is empty, but it is more typical for the source container 16 to contain an amount of fluid and for the satellite container 22 to be empty.

With the fluid-containing fluid flow circuit 18 mounted to the frame 12, the controller 30 may begin a fluid splitting procedure in which fluid is transferred from one of the containers 16, 22 (typically the source container 16) to the other container 16, 22 (typically the satellite container 22) until targeted amounts of fluid are contained in each. When instructing the controller 30 to begin a procedure, an operator may provide the controller 30 with the target amounts of fluid for each container 16, 22 or with a target ratio or the like. Alternatively, the controller 30 may be configured to determine the target amount of fluid for each container 16, 22. In one embodiment, which may be advantageous when splitting a high volume platelet product, the targeted amounts of fluid in each container 16, 22 are the same or at least substantially the same, such that the controller 30 continues the procedure until the weights of the contents of each container 16, 22 are equated or at least substantially equated. In other embodiments, the targeted amounts of fluid in each container 16, 22 are different, which may include more fluid being contained within the source container 16 or in the satellite container 22 at the end of a procedure.

The manner in which fluid is conveyed from one container to the other container may vary without departing from the scope of the present disclosure. In the illustrated embodiment, the source support 14 is positioned at a greater elevation than the satellite support 20, which allows for fluid flow from the source container 16 to the satellite container 22 via gravity. According to a gravity-based approach, the clamp system 26 is opened by the controller 30 to allow fluid to flow from the source container 16 to the satellite container 22 under the force of gravity while the controller 30 monitors the weights reported by the weight scales 24. Once the controller 30 determines that the proper amounts of fluid are in each container the controller actuates the clamp system 26 to prevent further flow from the source container 16 to the satellite container 22 via the conduit 28.

In another embodiment, the system 10 may include a pump system 32 configured to convey fluid from one container to the other container. The pump system 32 (if provided) may be variously configured without departing from the scope of the present disclosure. In an exemplary embodiment in which the conduit 28 is configured as a flexible tube, the pump system 32 may include a peristaltic pump, for example, to convey fluid through the conduit 28.

If a pump system 32 is provided, the relative elevations of the supports 14 and 20 are less important than in embodiments relying solely upon gravity for fluid transfer. Additionally, if a pump system 32 is provided, the controller 30 may be configured to allow for transfer fluid through the conduit 28 in either direction, which may not be possible in a gravity-based system (except those embodiments in which the relative elevations of the source support 14 and the satellite support 20 may be changed). This may be advantageous if the controller 30 determines that too much fluid has been transferred from one container to the other container, in which case the controller 30 may control the pump system 32 to convey fluid through the conduit 28 in the opposite direction to bring the fluid levels in the containers 16 and 22 to the proper levels. Pumping fluid between the containers may also allow for quicker completion of a procedure compared to what is possible using a gravity-based approach.

Another opportunity created by a pump system 32 is the ability for the controller 30 to be configured to control operation of the clamp system 26 based at least in part on the operation of the pump system 32. For example, at the beginning of a procedure, the controller 30 will know the amounts of fluid initially in each container and the amounts of fluid to be contained in each container at the end of the procedure. During the course of the procedure, the controller 30 will also know (and control) the rate of operation of the pump system 32. Based on the volumetric flow rate of the pump system 32 during the course of the procedure, the controller 30 may determine the amount of fluid that has been conveyed from one container to the other container, along with the level of fluid in each container. When the controller 30 has determined that the proper amount of fluid has been conveyed from one container to the other container (based at least in part upon the volumetric flow rate of the pump system 32), the controller 30 stops operation of the pump system 32 and actuates the clamp system 26 to prevent further flow between the containers 16 and 22.

While use of a pump system 32 may have several advantages, it may also increase the size and cost of the frame 12. Additionally, a pump system 32 may also require use of a particular fluid flow circuit, whereas a gravity-based approach may be used with a wide range of fluid flow circuits. Different collection centers have different priorities and needs, with some that would prefer the flexibility and lower cost of a gravity-based system and other preferring the added functionality of a pump-based system. It should be understood that, even if a frame 12 is provided with a pump system 32, it is within the scope of the present disclosure for the pump system 32 to remain inactive and for fluid to be transferred from one container to the over via gravity.

Regardless of how fluid is conveyed from one container to the other container, once the proper amounts of fluid are in each container, the controller 30 may actuate a sealing system 34 (if provided). The sealing system 34 seals the conduit 28 in at least one location to prevent fluid flow through the conduit 28, thereby ensuring that the proper amounts of fluid remain in each container at the end of a procedure. In the illustrated embodiment, the sealing system 34 is configured to seal the conduit 28 at two locations, one of which is directly adjacent to the source container 16 and the other of which is directly adjacent to the satellite container 22. The configuration of the sealing system 34 may vary without departing from the scope of the present disclosure. In an exemplary embodiment in which the conduit 28 is configured as a flexible tube, the sealing system 34 may be configured to seal the conduit 28 via a heat seal, with the conduit 28 being pressed shut and then heat being applied (by a radio frequency generator, for example) to melt the walls of the conduit 28 together.

The sealing system 34 may be further configured to sever the conduit 28 at the location(s) of the seal(s) to allow for separate transport, storage, and/or use of the containers 16 and 22. A seal may be severed by blade or the like or by any suitable approach, which may vary depending on the natures of the conduit 28 and the seal.

Employing such a system 10 and fluid splitting procedure yields many advantages when splitting a high volume platelet product. Compared to a conventional manual approach, the opportunities for operator error are greatly reduced, if not eliminated. Additionally, due to the increased accuracy of the weight measurements and the more precise control of fluid flow between the containers, additional units of platelet product may be obtained from a given high volume platelet product. As described above, due to the limitations of existing manual splitting methods, platelet products having $3.0$-$6.4 \times 10^{11}$ platelets are considered to be a single unit, with platelet products having $6.5$-$9.4 \times 10^{11}$ platelets being considered two units. Use of the system 10 and the associated fluid splitting procedure allows for platelet products having $6.1$-$6.4 \times 10^{11}$ platelets to be split into be two units instead of one. Thus, in certain circumstances, an additional unit of platelet product may be produced compared to what is possible according to the conventional approach.

Figure 2:
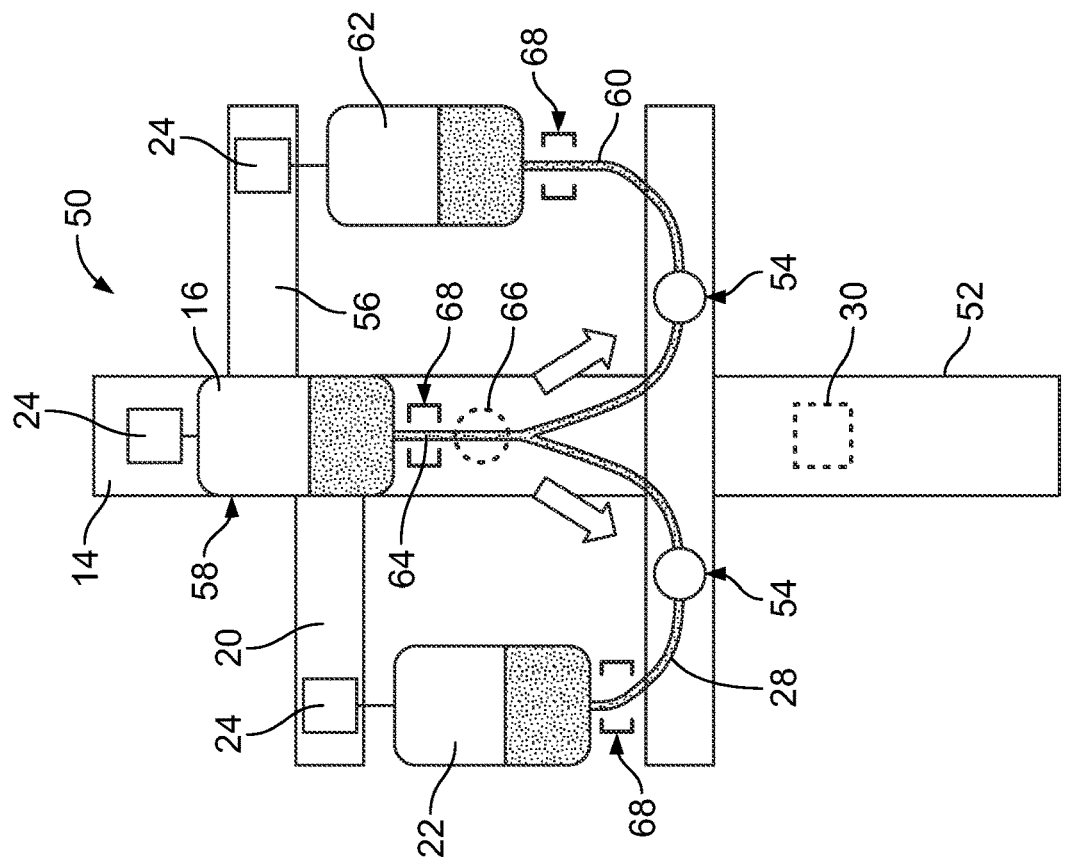
FIG. 2 is a schematic view of an exemplary embodiment of a system for splitting a fluid into three amounts, according to an aspect of the present disclosure.

It should be understood that the principles described herein are not limited to separation of a high volume fluid into two parts, but rather a fluid may be separated into more than two parts. FIG. 2 illustrates an exemplary configuration of a fluid splitting system 50 for splitting a high volume fluid into three parts. A system for splitting a high volume fluid into three parts may be differently configured from the system 50 of FIG. 2, and the principles described herein with regard to the system 50 of FIG. 2 may be employed in providing a system for splitting a high volume fluid into any number of parts.

The system 50 of FIG. 2 is configured similarly to the foregoing description of the system 10 of FIG. 1, except for some notable differences. In particular, the frame 52 of the system 50 of FIG. 2 includes a modified clamp system 54 and a second satellite support 56, which has an associated weight scale 24.

The modifications to the frame 52 are designed to accommodate a fluid flow circuit 58 that is differently configured from the fluid flow circuit 18 of FIG. 1. In particular, the fluid flow circuit 58 of FIG. 2 includes an additional conduit 60 connecting the source container 16 to a second satellite container 62. The modified clamp system 54 accommodates the additional conduit 60 to control fluid flow therethrough, while the second satellite support 56 is configured to support the second satellite container 62. In the illustrated embodiment, the conduits 28 and 60 leading to the satellite containers 22 and 62 branch off from a single or common conduit 64 connected to the source container 16. In other embodiments, the conduits 28 and 60 connected to the satellite containers 22 and 62 may each directly connect to the source container 16. If the system 50 includes a pump system 66, the pump system 66 may also be differently configured to allow for fluid to be pumped through the conduit 60 connected to the second satellite container 62. Additionally, if the system 50 includes a sealing system 68, it may be differently configured to allow for the conduit 60 connected to the second satellite container 62 to be sealed after the second satellite container 62 has been filled to a target level.

In the illustrated embodiment, each satellite support 20, 56 is positioned at a different elevation, with each being positioned at a lower elevation than the source support 14. By such a configuration, fluid may be conveyed from the source container 16 to the satellite containers 22 and 62 via gravity, with the higher satellite container 62 filling more quickly than the lower satellite container 22 (assuming that fluid is allowed to freely flow from the source container 16 into the satellite containers 22 and 62). Upon the controller 30 receiving a signal from the weight scale 24 indicating that the upper satellite container 62 has been filled to the desired level, the controller 30 may actuate the clamp system 54 to prevent further fluid flow through the conduit 60 connected to the upper satellite container 62. Fluid flow from the source container 16 to the lower satellite container 22 continues until the controller 30 receives a signal from the weight scale 24 indicating that the lower satellite container 22 has been filled to the desired level, at which time the controller may actuate the clamp system 54 to prevent further flow out of the source container 16. If provided, the sealing system 68 may be actuated by the controller 30 to seal the conduits of the fluid flow circuit 58 at suitable locations to prevent fluid flow out of each container. If fluid flow into one satellite container is completed before fluid flow into another satellite container, the sealing system 68 may be actuated to seal the conduit connected to the first-filled satellite container either before or after the other satellite container has been filled.

Filling one satellite container before the other satellite container may be advantageous to the extent that it allows for the controller 30 to execute an initial check of the amount of fluid in the first-filled satellite container before fluid flow out of the source container 16 is completed. If the controller 30 determines that an additional amount of fluid should be conveyed into the first-filled satellite container, then the controller 30 may actuate the clamp system 54 to allow for further flow into the first-filled satellite container. For this reason, while it is possible for the conduit connected to a first-filled satellite to be sealed prior to completion of fluid flow to another container, it may be advantageous for all sealing to be done at the end of a procedure in case adjustments to the fluid level of any container is required.

In another embodiment, rather than the satellite supports 20 and 56 being positioned at different elevations, two or more satellite supports may be positioned at the same elevation, which may be lower than the elevation at which the source support is positioned. In such an embodiment, fluid would tend to flow (under the force of gravity) from the source container into the satellite containers at approximately the same rate. If the satellite containers are to be filled to the same level, this would result in the satellite containers being filled to completion at approximately the same time, assuming that fluid flow from the source container 16 to each satellite container 22, 62 begins at the same time.

It should be understood that fluid flow from the source container 16 to the satellite containers 22 and 62 may be initiated simultaneously or sequentially. Additionally, the controller 30 may be configured to allow for simultaneous flow into the satellite containers 22 and 62 or may control the clamp system 54 (and the pump system 66, if provided) to allow for flow from the source container 16 into only one satellite container at a time. This may include flowing fluid from the source container 16 into one of the satellite containers until that satellite container is filled to the desired level before any fluid is conveyed from the source container 16 into the other satellite container or may instead involve fluid being alternately conveyed into one satellite container and then the other, with the destination of fluid flow being changed multiple times before either satellite container is filled to the desired level. Filling one satellite container to the target level before begin flow into the other satellite container may be advantageous in terms of accuracy (as small adjustments could be made to the amount of fluid in the first satellite container to be filled before allowing flow into the other satellite container), but may take longer than other approaches.

In one embodiment, fluid is allowed to flow into both satellite containers 22 and 62 at the same time, with flow into one of the satellite containers being closed at some point before its weight has reached the target level. In the case of gravity-based flow using the system 50 of FIG. 2 to fill the satellite containers 22 and 62 to the same level, the upper satellite container 62 would tend to fill more quickly than the lower satellite container 22, such that the controller 30 would act to prevent the upper satellite container 62 from being filled to its target level. The other satellite container (which may be the lower satellite container 22 in a gravity-based approach) is filled to the desired volume and then the controller 30 actuates the clamp system 54 to prevent further fluid flow into that satellite container. The controller 30 then actuates the clamp system 54 to again allow flow into the first satellite container (which may be the upper satellite container 62). So actuating the clamp system 54 toward the end of the procedure allows for a system check and small adjustments if fluid volumes do not match the desired volume split.

Opening flow to all satellite containers at the same time and ending flow into them at the same time has the possible advantage of completing a procedure more quickly than other flow patterns. However, such an approach may sacrifice the ability to execute a mid-procedure volume check and/or small volume adjustments at the end of a procedure. If the system 50 operates sufficiently precisely that such checks and adjustments are not required, then it may be advantageous for fluid flow into all satellite containers to begin and end at the same time in order to reduce processing time.

As described above, due to the limitations of existing manual splitting methods, platelet products having $6.5\text{-}9.4\times10^{11}$ platelets are considered two units. Use of the system 50 and the associated fluid splitting procedure allows for platelet products having $9.1\text{-}9.4\times10^{11}$ platelets to be split into be three units instead of two. Thus, in certain circumstances, an additional unit of platelet product may be produced compared to what is possible according to the conventional approach.

As described above, it is within the scope of the present disclosure for the targeted amounts of fluid in at least two of the containers 16, 22, 62 to be different. For example, in one embodiment, the source container 16 may be targeted to have a particular percentage (e.g., 40%) of the fluid in the fluid flow circuit 58, while each satellite container 22, 62 is targeted to have particular percentages (e.g., 30% each) of the fluid in the fluid flow circuit 58. In another exemplary embodiment, a procedure may continue until a particular amount of fluid has been conveyed into each satellite container 22, 62 (e.g., 200 grams of fluid), with all of the remaining fluid in the fluid flow circuit 58 being kept in the source container 16 at the end of a procedure. In yet another embodiment, a procedure may continue until a particular amount of fluid remains in the source container 16, with the rest of the fluid in the fluid flow circuit 58 being distributed between the satellite containers 22 and 62. Thus, it should be clear that the present disclosure is not limited to a particular fluid distribution amongst the containers of a fluid flow circuit.

While various approaches to using the system 50 of FIG. 2 to separate a high volume fluid into three parts have been described, it should be understood that the system 50 may also be used in combination with a fluid flow circuit 18 of the type shown in FIG. 1 to separate a fluid into only two parts. When separating a fluid into only two parts, one of the satellite supports would remain empty, while its associated weight scale 24 and any components of the clamp system 54 and (if provided) the pump and sealing systems 66 and 68 configured to cooperate with a conduit connected to a second satellite container would remain inactive. Fluid splitting would then proceed according to the approach described above with regard to the system 10 of FIG. 1.

The systems 10 and 50 are shown as standalone devices, but it should be understood that they may be incorporated into a larger assembly or otherwise paired with another fluid processing device. For example, in one embodiment, if the fluid to be split is a biological fluid, such as a blood component (which may be, without limitation, a high volume platelet product), the system may be paired with an apheresis system, such as the AMICUS® system manufactured by Fenwal, Inc. of Lake Zurich, Illinois, which is an affiliate of Fresenius Kabi AG of Bad Homburg, Germany. In such an implementation, blood is separated by the apheresis system into two or more components, with a high volume platelet product (or other fluid) being produced by the apheresis system. The high volume platelet product or other fluid is conveyed from the apheresis system directly into a source container 16 being supported by the source support 14. With the high volume platelet product or other fluid in the source container 16, a fluid splitting procedure of the type described above may be executed. If practicable, this may be more time-efficient than separating the blood using an apheresis system, transporting a fluid produced by the apheresis system to the fluid splitting system (which may be located at a different site than the apheresis system), and then splitting the fluid using the fluid splitting system.

Incorporating the systems 10 and 50 into a larger assembly or otherwise pairing it with another fluid processing device may include fluidly connecting a fluid flow circuit configured to be mounted to the system with a fluid flow circuit configured to be mounted to a separate fluid processing device. This may be achieved according to any suitable approach (e.g., using a luer connector), but in one embodiment, may be achieved by sterile connection of conduits of the two fluid flow circuits according to the approaches described in U.S. Pat. No. 9,199,070 or 10,040,247, both of which are hereby incorporated herein by reference.

While each support is described and illustrated as including an associated weight scale, it is contemplated that one support of a given frame could be provided without an associated weight scale or that one of the weight scales could be inactive during a fluid splitting procedure. In one example, if the volume of the source container is known to be the same from procedure to procedure or is input by an operator, then the source support 14 could omit a weight scale (or have an inactive weight scale) because the volume to be distributed could be calculated. In another example, if the tare weights of the satellite containers were known to be identical from procedure to procedure, then one of the satellite supports could omit a weight scale (or have an inactive weight scale). In yet another example, if a pump system is employed, the controller 30 being cognizant of the volumetric flow rate of the pump system may allow for at least one weight scale to be omitted (or be rendered inactive), as the amount of fluid in a container may be calculated based on the rate of operation of the pump system.

The systems of FIGS. 1 and 2 are illustrated with frames having supports that are fixed in position with respect to the frame, but it should be understood that a system according to the present disclosure may include a frame with at least one support having a position that is adjustable with respect to the frame. As will be described in greater detail herein, the position of a container support member may be adjusted in a vertical direction and/or in a horizontal direction with respect to the frame, which increases the flexibility and utility of the system by allowing for a variety of differently configured fluid flow circuits and/or fluid containers to be used with the system. Additionally (or alternatively), the container support member may be configured for replacement by a differently configured container support member, which also increases the flexibility and utility of the system by allowing for a variety of differently configured fluid containers to be used with the system.

Figure 3:
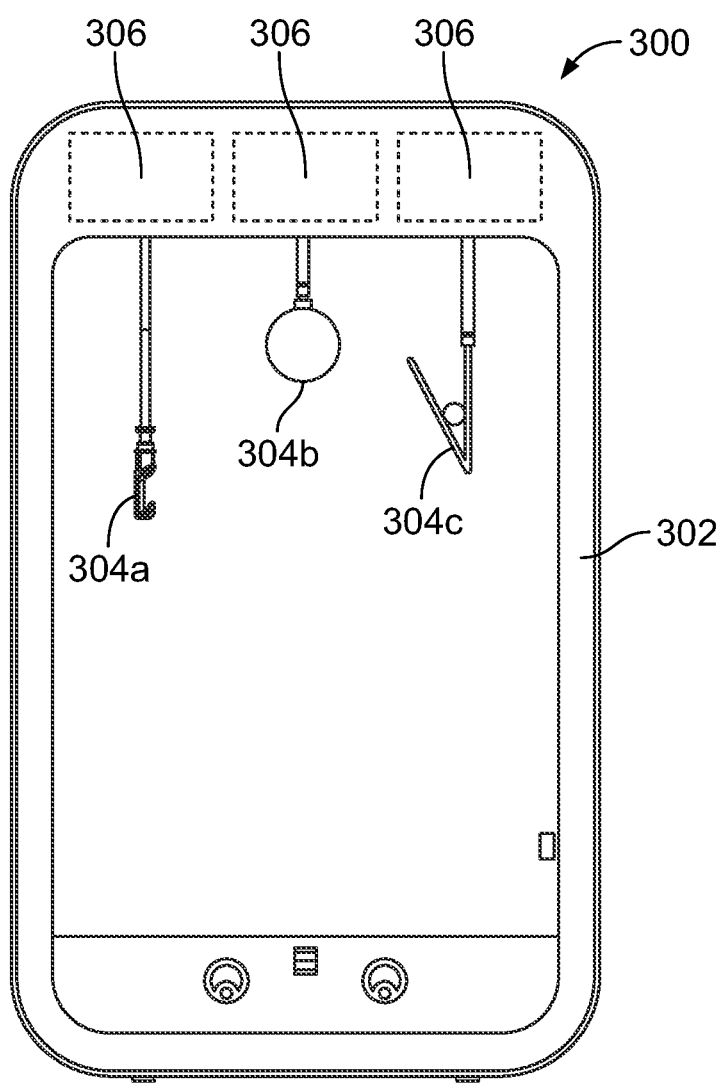
FIG. 3 is a front elevational view of another exemplary embodiment of a system for supporting a fluid container, according to an aspect of the present disclosure.

FIG. 3 shows such a system 300 including at least one container support member that may be adjustably positioned with respect to a frame of the system. More particularly, the system 300 includes a frame 302, at least one container support member 304 (individually identified in FIG. 3 as 304a, 304b, and 304c) configured to engage and support a fluid container, and at least one position adjustment assembly 306. The position adjustment assembly 306 associates the container support member 304 to the frame 302 (and, more preferably, to a weight scale of the system) and is configured to allow for adjustment of a position of the container support member 304 with respect to the frame 302. The system 300 may include additional components without departing from the scope of the present disclosure, such as weight scales 24 associated with each of the position adjustment assemblies 306.

A position adjustment assembly 306 may be configured to adjust the vertical and/or horizontal position of the associated container support member 304 with respect to the frame 302. While FIG. 3 shows a single position adjustment assembly 306 associated with each container support member 304, it should be understood that a single container support member 304 may be associated with no position adjustment assemblies 306 or a plurality of position adjustment assemblies 306, with each configured to adjust the relative position of the container support member 304 in a different direction (e.g., with a first adjusting the vertical position and a second adjusting the horizontal position). If a single container support member 304 is provided with a plurality of associated position adjustment assemblies 306, the position adjustment assemblies 306 may be differently or similarly configured.

FIG. 3 shows a system 300 having three pairs of container support members 304 and position adjustment assemblies 306, but it should be understood that fewer or more than three of such pairs may be provided. Additionally, it should be understood that, if a system 300 is provided with a plurality of container support members 304 and position adjustment assemblies 306, at least two of the container support members 304 and/or at least two of the position adjustment assemblies 306 (which will be described in greater detail herein) may be differently configured. For example, FIG. 3 illustrates one container support member 304a as a hook, another container support member 304b as a ring, and a third container support member 304c as a clip or clamp, with each being appropriate for use in combination with a differently configured fluid container. For example, a container support member 304a configured as a hook may be useful with a fluid container defining an aperture or opening that is configured to receive the hook. A container support member 304b configured as a ring may be useful with a fluid container including a hook configured to be accommodated by the ring. A container support member 304c configured as a clip or clamp may be useful with a fluid container having neither an aperture nor a hook, with the clip or clamp gripping a portion of the fluid container to support it. It should be understood that other configurations may also be employed without departing from the scope of the present disclosure, such as a container support member 304 configured as a horizontal surface or platform on which a fluid container may be placed. A position adjustment assembly 306 may be provided with a formation or feature allowing for the associated container support member 304 to be detached and replaced with a differently configured container support member 304, which allows for the system 300 to be used with a wider variety of fluid containers.

Figure 4:
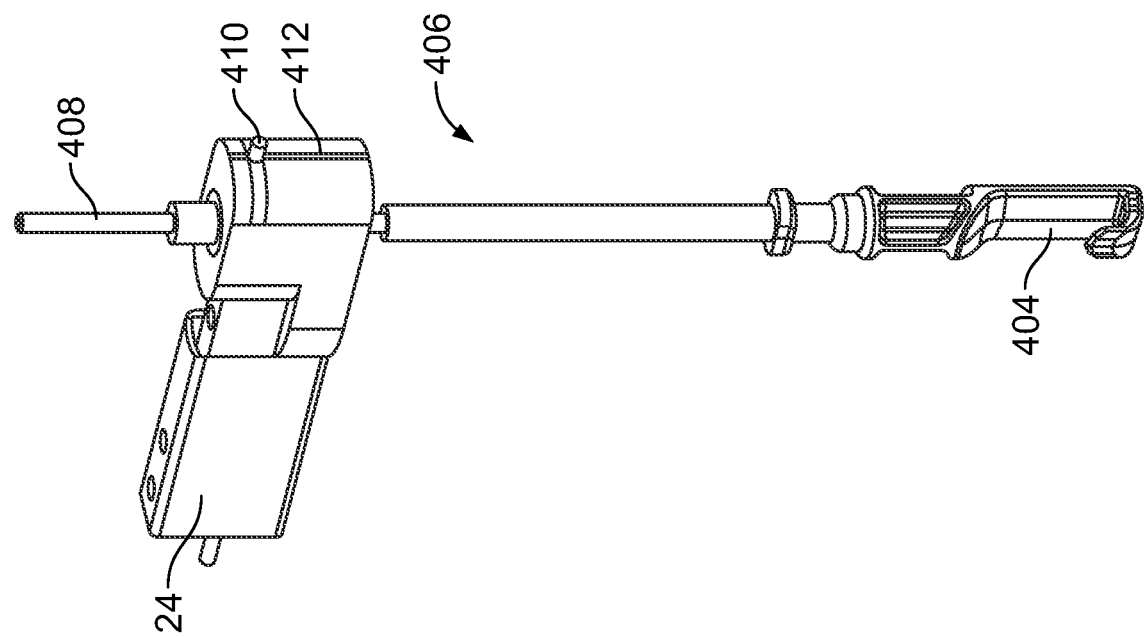
FIG. 4 is a perspective view of an exemplary position adjustment assembly suitable for incorporation into the system of FIG. 3, which includes a mechanical screw.

As alluded to above, there are different possible configurations for a position adjustment assembly, with FIGS. 4-16 illustrating several possible configurations. It should be understood that the configurations shown in FIGS. 4-16 are merely exemplary and that other configurations and mechanisms may be employed without departing from the scope of the present disclosure. In the embodiment of FIG. 4, the position adjustment assembly 406 employs a mechanically actuatable adjustment mechanism to adjust the position of an associated container support member 404 with respect to the system frame. In the orientation shown in FIG. 4, the position adjustment assembly 406 may be actuated to adjust a vertical position of the associated container support member 404 with respect to the system frame. It is also possible to employ the same position adjustment assembly 406 to adjust a horizontal position of the associated container support member 404 by rotating selected components of the illustrated position adjustment assembly 406 90° from the orientation shown in FIG. 4.

The adjustment mechanism of FIG. 4 comprises a screw or threaded rod 408. The screw 408 may be variously configured without departing from the present disclosure, such as being configured as a leadscrew, screw jack, ball screw, roller screw, or linear rail actuators (for example). The position adjustment assembly 406 also includes an actuator 410 and a threaded nut 412 in driven association to the actuator 410. The screw 408 has external threads that mate with internal threads of the threaded nut 412. In addition to showing the container support member 404 and the various components of the position adjustment assembly 406, FIG. 4 also shows a weight scale 24 associated to the position adjustment assembly 406 and configured to measure the weight of a fluid container supported by the container support member 404.

The actuator 410 (which may be configured as a knob or dial or wheel, for example) is operated to cause the threaded nut 412 to rotate in place about a central axis defined by the screw 408. On account of the mating threads, rotation of the threaded nut 412 causes the screw 408 and the associated container support member 404 to move along the central axis of the screw 408, which is a vertical direction in the orientation of FIG. 4. The actuator 410 may be operated in a forward direction to rotate the threaded nut 412 in a first direction (e.g., a clockwise direction), which causes corresponding movement of the screw 408 and container support member 404 in a first direction with respect to the system frame (e.g., in a vertically downward direction). When the actuator 410 is operated in a reverse direction, it will cause the threaded nut 412 to rotate in the opposite direction (e.g. in a counterclockwise direction), which causes corresponding movement of the screw 408 and container support member 404 in a second direction (e.g., in a vertically upward direction) In an alternative embodiment, the position adjustment assembly 406 may be oriented at 90° from its illustrated orientation, in which case it would be actuated (as described above) to adjust the horizontal position of the container support member 404 with respect to the system frame.

Figure 5:
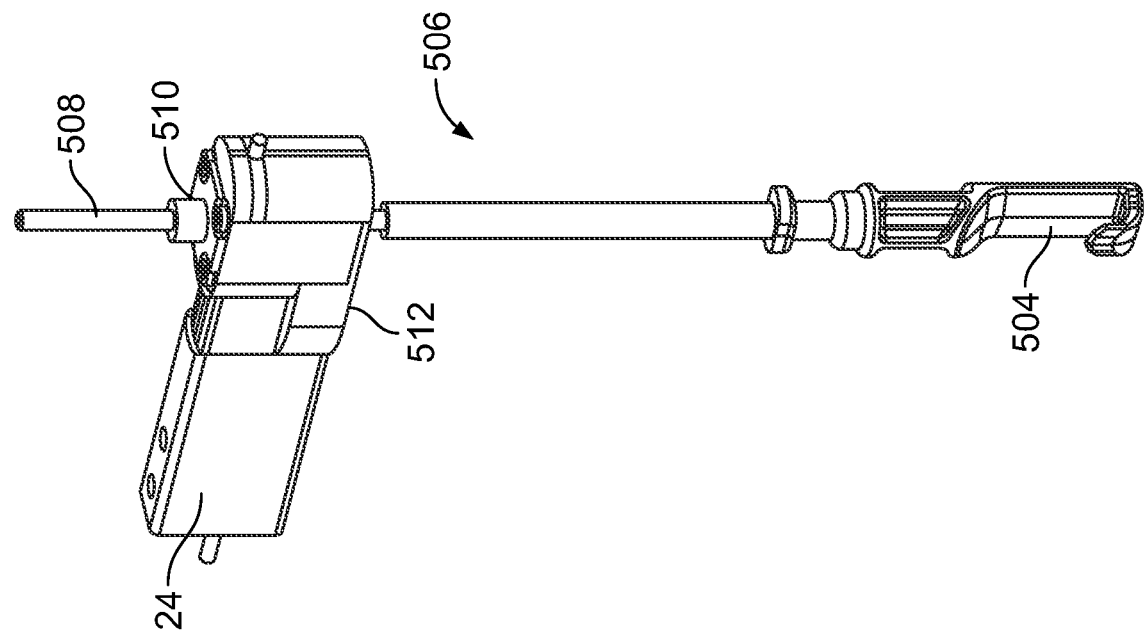
FIG. 5 is a perspective view of another exemplary position adjustment assembly suitable for incorporation into the system of FIG. 3, which includes an electromechanical screw.

FIG. 5 shows a position adjustment assembly 506 that is similarly configured to the position adjustment assembly 406 of FIG. 4, but employs an electromechanically actuatable adjustment mechanism, rather than a mechanically actuatable adjustment mechanism, to adjust the position of the associated container support member 504. As in the embodiment of FIG. 4, the adjustment mechanism of the embodiment of FIG. 5 comprises a screw 508 having external threads. However, rather than employing a threaded nut 412 and associated actuator 410 that is manually manipulated to rotate the threaded nut 412, the position adjustment assembly 506 instead employs an electro-mechanical screw actuator 510 with an associated motor 512 that is actuated to move the screw 508 and the container support member 504.

More particularly, the motor 512 is driven in a forward direction (e.g., automatically or under direction of an operator using an appropriate user interface) to rotate the electromechanical screw actuator 510 in a first direction (e.g., a clockwise direction), which causes corresponding movement of the screw 508 and container support member 504 in a first direction with respect to the system frame (e.g, in a vertically downward direction). When the motor 512 is driven in a reverse direction, it will cause the electromechanical screw actuator 510 to rotate in the opposite direction (e.g. in a counterclockwise direction), which causes corresponding movement of the screw 508 and container support member 504 in a second direction (e.g., in a vertically upward direction) In an alternative embodiment, the position adjustment assembly 506 may be oriented at 90° from its illustrated orientation, in which case it would be actuated (as described above) to adjust the horizontal position of the container support member 504 with respect to the system frame.

Figure 6:
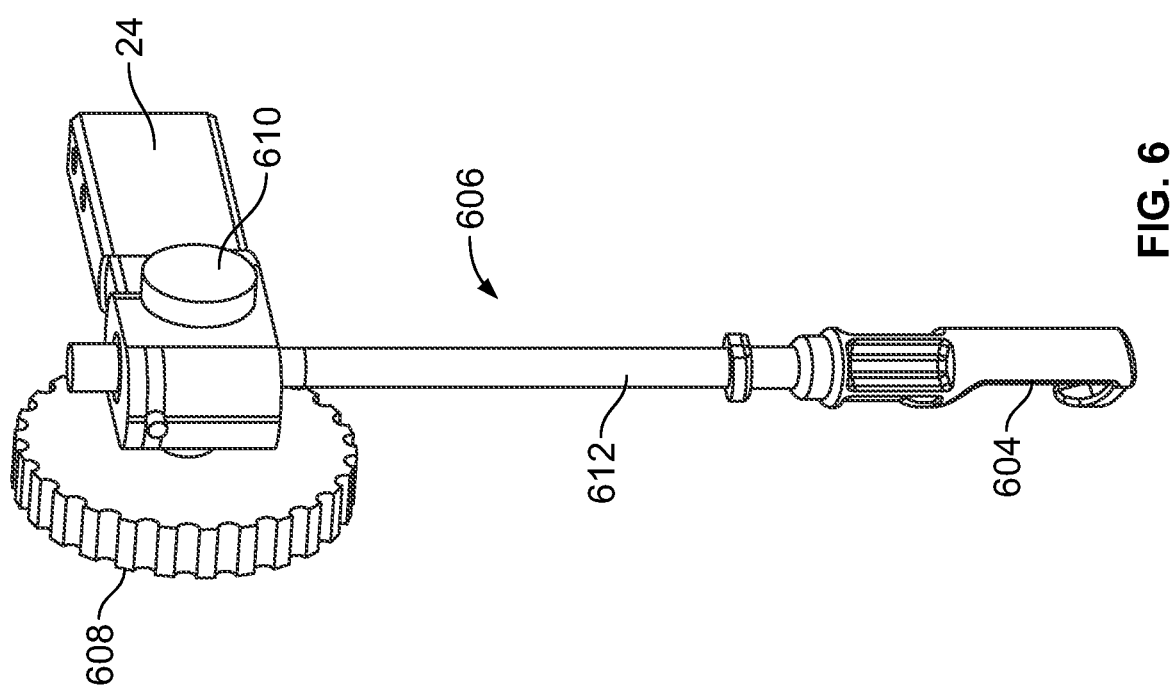
FIG. 6 is a perspective view of yet another exemplary position adjustment assembly suitable for incorporation into the system of FIG. 3, which includes a mechanical wheel and axle.

FIG. 6 shows another embodiment of a position adjustment assembly 606 including a mechanically actuatable adjustment mechanism. The adjustment mechanism of FIG. 6 comprises a wheel 608 connected to an axle 610, with rotation of the wheel 608 (e.g., by manual manipulation) causing rotation of the axle 610 about its central axis. At least a portion of the wheel 608 may be positioned outside of the system frame or otherwise accessibly positioned within the system frame to allow a user to manipulate the wheel 608.

The axle 610 is mated to a connection member 612, which is associated to the container support member 604. The connection member 612 may be variously configured, provided that rotation of the axle 610 causes movement of at least a portion of the connection member 612 in a direction along a central axis of the connection member 612 (which is a vertical direction in the orientation of FIG. 6). In one embodiment, the connection member 612 is flexible, being configured as a chain or belt or cable (for example), which alternately wraps around the axle 610 and is unwound from the axle 610 (depending on the direction of rotation of the axle 610) to move the container support member 604 with respect to the system frame. Such an embodiment may be understood as a form of a winch. In another embodiment, the connection member 612 is rigid, being configured as a rod or shaft, for example. Rather than wrapping around the axle 610, the axle 610 is provided with teeth (not illustrated) that mesh with teeth (not illustrated) of the rigid connection member 612, with rotation of the axle 610 being transferred to the connection member 612 (via the mating teeth), which moves in a direction along the central axis of the connection member 612. Such an embodiment may be understood as a form of a rack-and-pinion arrangement.

As described above, manual rotation of the wheel 608 in one direction (e.g., a clockwise direction) will lower the container support member 604, while rotation of the wheel 608 in the opposite direction (e.g., a counterclockwise direction) will raise the container support member 604 in the orientation shown in FIG. 6. In another embodiment, the position adjustment assembly 606 may be reconfigured to move the container support member 604 horizontally. This may be achieved by orienting selected components of the position adjustment assembly 606 90° with respect to their illustrated orientation. As a flexible connection member 612 may rely on gravity to move the container support member 604 in at least one direction, it may be preferable to employ an at least generally rigid connection member 612 for horizontal position adjustments.

Figure 7:
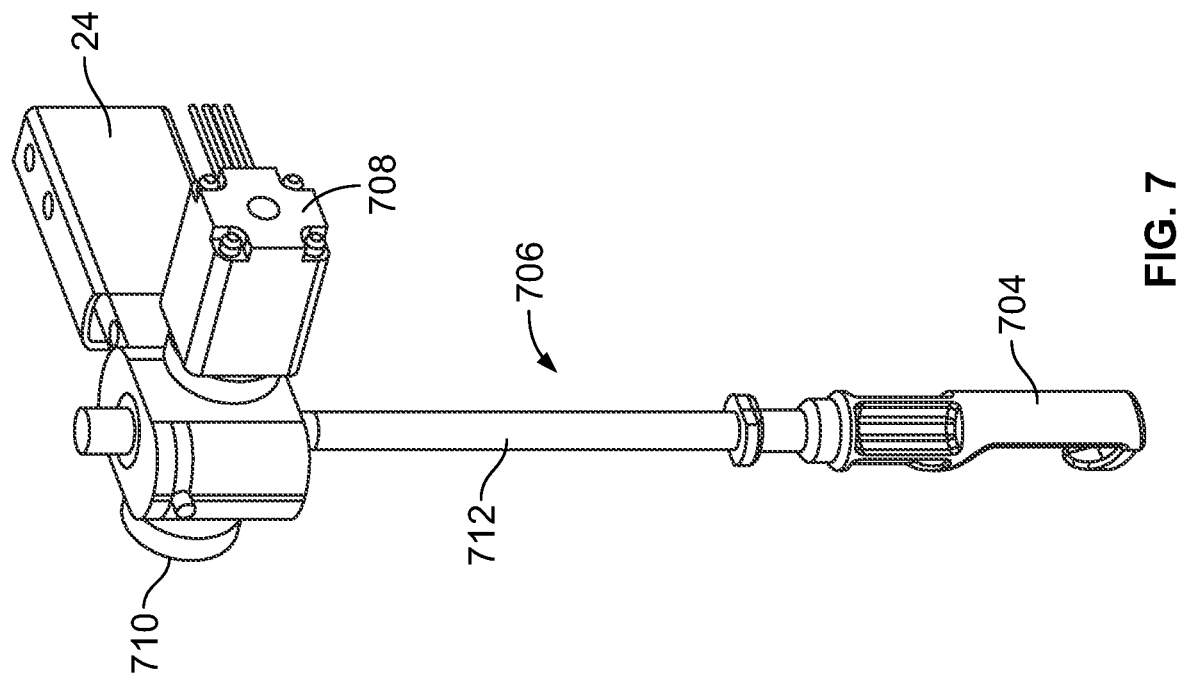
FIG. 7 is a perspective view of another exemplary position adjustment assembly suitable for incorporation into the system of FIG. 3, which includes an electromechanical wheel and axle.

FIG. 7 shows a variation of the position adjustment assembly 606 of FIG. 6, which employs an electromechanically actuatable adjustment mechanism, rather than a mechanically actuatable adjustment mechanism. The adjustment mechanism of the position adjustment assembly 706 of FIG. 7 comprises an axle 710 and a connection member 712, which may be similarly configured to the corresponding components of FIG. 6. The wheel 608 of FIG. 6 is replaced by a motor 708, with the motor 708 being driven in a forward direction (e.g., automatically or under direction of an operator using an appropriate user interface) to rotate the axle 710 in a first direction and move the container support member 704 in a first direction, and with the motor 708 being driven in a reverse direction to rotate the axle 710 and move the container support member 704 in second directions that are opposite to the first directions. As with the embodiment of FIG. 6, while FIG. 7 illustrates an orientation that would cause vertical movement of the container support member 704 with respect to the frame 702, the position adjustment assembly 706 may be reconfigured to cause the container support member 704 to instead move horizontally.

Figure 8:
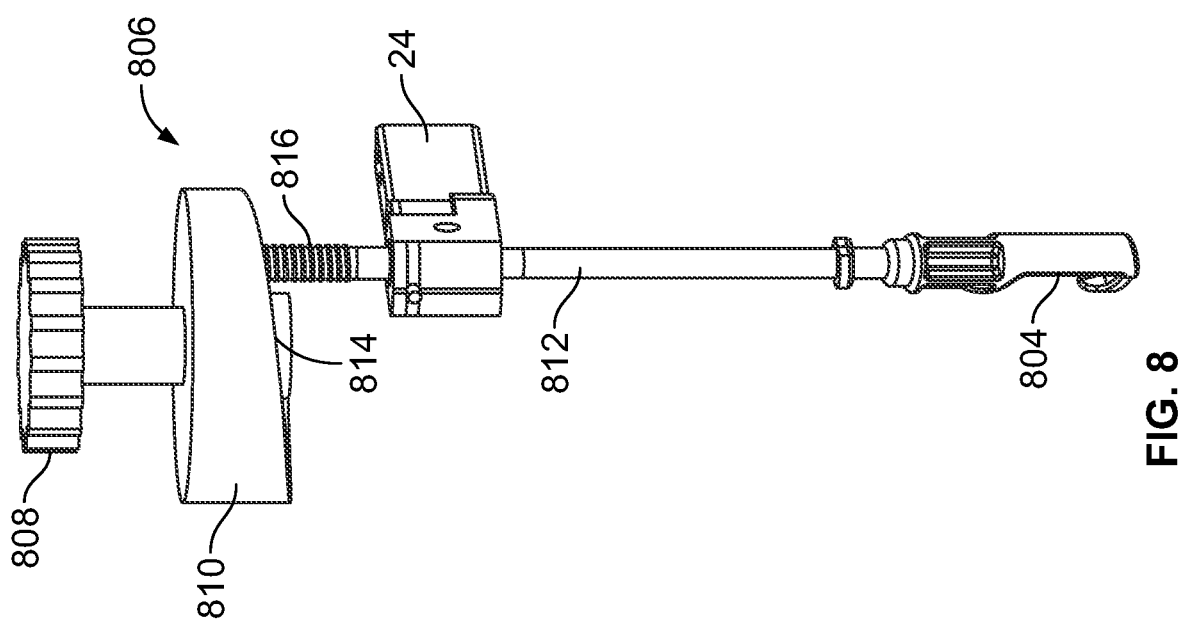
FIG. 8 is a perspective view of yet another exemplary position adjustment assembly suitable for incorporation into the system of FIG. 3, which includes a mechanical cam.

FIG. 8 shows yet another embodiment of a position adjustment assembly 806 including a mechanically actuatable adjustment mechanism. The adjustment mechanism of FIG. 8 comprises a cam 810 that is connected to a wheel 808. When a user manually rotates the wheel 808, the cam 810 rotates about a central axis of the wheel 808. As in the embodiment of FIG. 6, a portion of the wheel 808 may be positioned outside of the frame 802 to allow the wheel 808 to be manipulated by a user, or the wheel 808 may otherwise be accessibly positioned within the frame 802.

The cam 810 includes an inclined surface 814, which bears against a first end of a shaft or connection member 812, which may be similarly configured to the connection member 612 of FIG. 6. A retaining spring 816 is provided and associated with the connection member 812 to bias the first end of the connection member 812 into engagement with the inclined surface 814 of the cam 810. Rotation of the cam 810 varies the portion of the inclined surface 814 that is contacted by the first end of the connection member 812, which produces linear movement at a second end of the connection member 812 (where the container support member 804 may be located), thereby adjusting the relative position of the container support member 804. In the embodiment shown, a user rotates the wheel 808 to adjust the vertical position of the container support member 804, but the position adjustment assembly 806 may be reoriented to allow for rotation of the wheel 808 to cause the container support member 804 to move horizontally.

Figure 9:
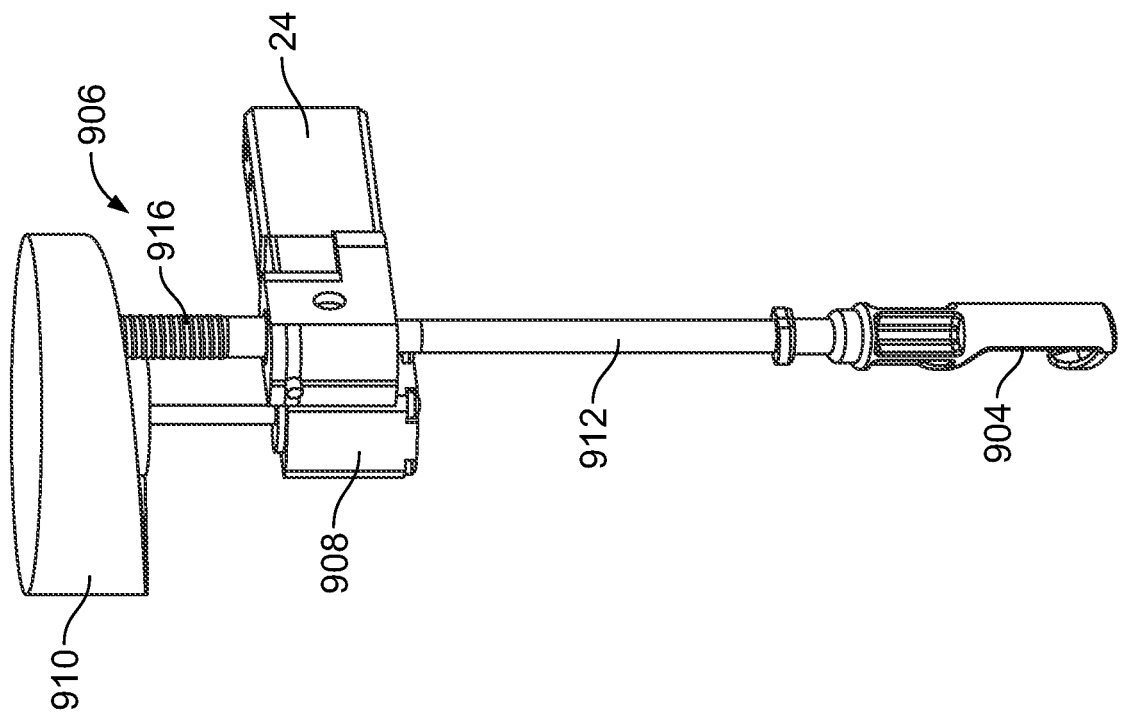
FIG. 9 is a perspective view of another exemplary position adjustment assembly suitable for incorporation into the system of FIG. 3, which includes an electromechanical cam.

FIG. 9 shows a variation of the position adjustment assembly 806 of FIG. 8, which employs an electromechanically actuatable adjustment mechanism, rather than a mechanically actuatable adjustment mechanism. The adjustment mechanism of the position adjustment assembly 906 of FIG. 9 comprises a cam 910, connection member 912, and retaining spring 916, which may be similarly configured to the corresponding components of FIG. 8. The wheel of FIG. 8 is replaced by a motor 908, which is driven (e.g., automatically or under direction of an operator using an appropriate user interface) in forward and reverse directions to rotate the cam 910 in opposite directions, thereby moving the container support member 904 in opposite directions, in accordance with the preceding description of the embodiment of FIG. 8. As with the embodiment of FIG. 8, while FIG. 9 illustrates an orientation that would cause vertical movement of the container support member 904 with respect to the system frame, the position adjustment assembly 906 may be reconfigured to cause the container support member 904 to instead move horizontally.

Figure 10:
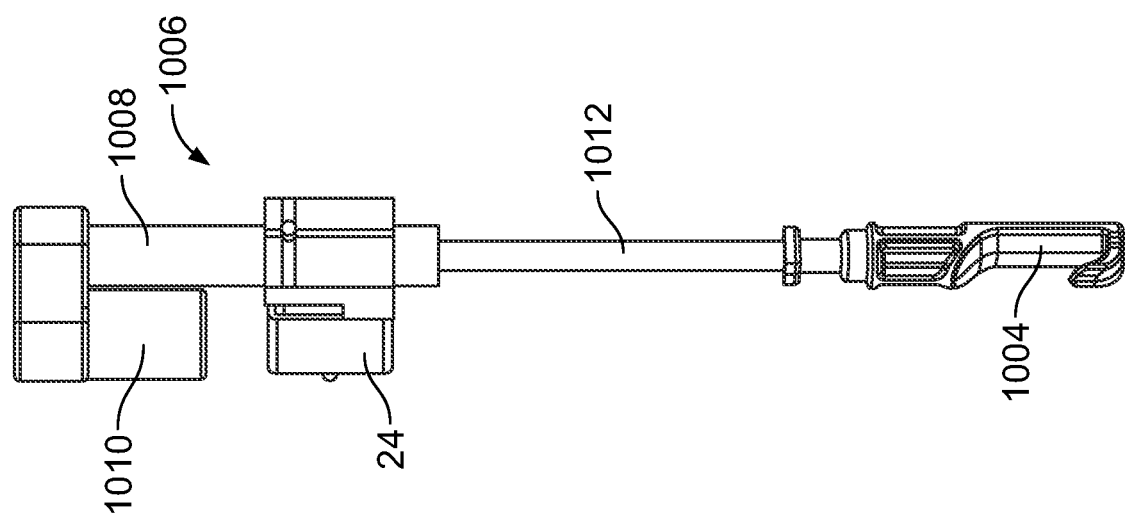
FIG. 10 is a perspective view of yet another exemplary position adjustment assembly suitable for incorporation into the system of FIG. 3, which includes a fluid cylinder.

FIG. 10 shows a position adjustment assembly 1006 including an adjustment mechanism having a cylinder 1008. The cylinder 1008 is hollow and contains a piston (not illustrated) that is configured to move through the cylinder 1008. The cylinder 1008 is associated with a connection member 1012, which may be provided in accordance with the preceding description of the connection member 612 of FIG. 6. As the piston moves through the cylinder 1008, the connection member 1012 (and associated container support member 1004) will similarly move, thereby adjusting the position of the container support member 1004 with respect to the system frame.

The adjustment assembly 1006 includes a fluid supply reservoir 1010 that fluidically communicates with the cylinder 1008. The reservoir 1010 contains a fluid that may be alternately conveyed to and withdrawn from the cylinder 1008 (e.g., automatically or under direction of an operator using an appropriate user interface) in order to vary the pressure within the cylinder 1008 above the piston. For example, in the embodiment shown, as pressure in the cylinder 1008 above the piston increases (by conveying fluid into the cylinder 1008), the piston moves downwardly, causing the connection member 1012 and the container support member 1004 to lower. As pressure in the cylinder 1008 above the piston decreases (by withdrawing fluid from the cylinder 1008), the piston moves upwardly, causing the connection member 1012 and the container support member 1004 to rise. The association of the fluid supply reservoir 1010 and the cylinder 1008 may be varied, with the fluid supply reservoir 1010 instead conveying fluid to and withdrawing fluid from a position within the cylinder 1008 that is below the piston. In such configuration, the addition of fluid to the cylinder 1008 will cause the piston, connection member 1012, and container support member 1004 to rise, while withdrawing fluid from the cylinder 1008 will cause them to lower. While FIG. 10 shows an orientation in which the position adjustment assembly 1006 adjusts the vertical position of the container support member 1004, it should be understood that the position adjustment assembly 1006 may be reconfigured to instead cause the container support member 1004 to be moved horizontally.

The nature of the fluid may vary without departing from the scope of the present disclosure. In one embodiment, the fluid is a liquid (rendering the cylinder 1008 a hydraulic cylinder), while the fluid is a gas in another embodiment (rendering the cylinder 1008 a pneumatic cylinder). Regardless of the nature of the fluid, the position adjustment assembly 1006 will operate in accordance with the preceding description. As for which type of fluid may be preferable, one of ordinary skill in the art will be familiar with the relative advantages and disadvantages of hydraulic and pneumatic cylinders and is capable of selecting which type of cylinder to use depending on the needs of a particular system or application.

Figure 11:
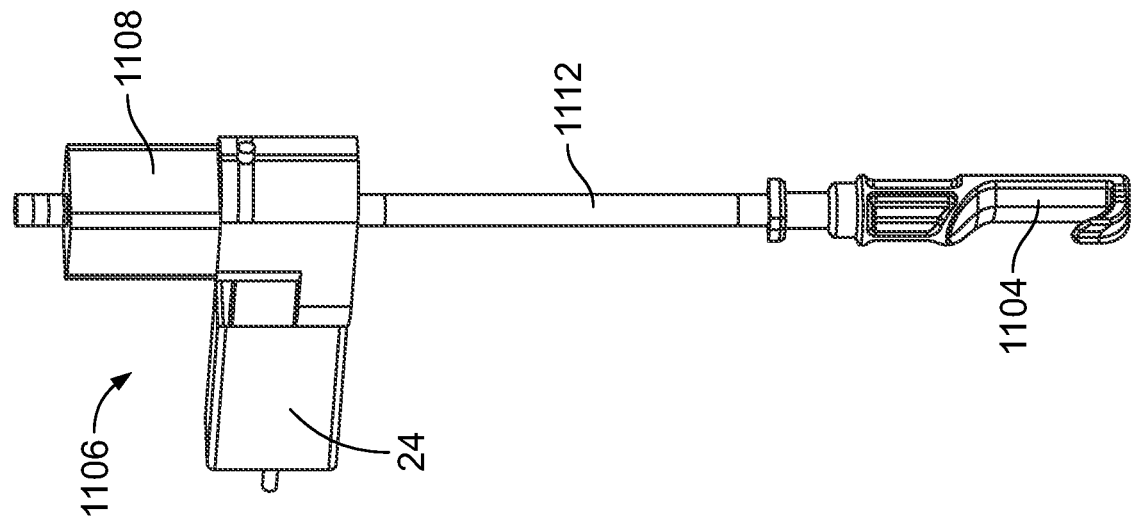
FIG. 11 is a perspective view of another exemplary position adjustment assembly suitable for incorporation into the system of FIG. 3, which includes a magnetic linear motor.
Figure 12:
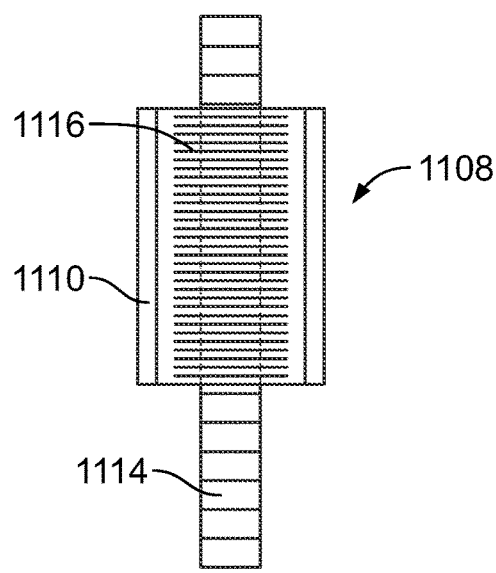
FIG. 12 is a front cross-sectional view of the magnetic linear motor of the position adjustment assembly of FIG. 11.

FIG. 11 shows a position adjustment assembly 1106 including an adjustment mechanism having a magnetic linear motor 1108, which is shown in greater detail in FIG. 12. The motor 1108 includes a forcer 1110 containing a plurality of electromagnetic coils 1116, with a plurality of aligned disk magnets 1114 passing through the centers of the electromagnetic coils 1116. The disk magnets 1114 are arranged in an alternating pattern, with the north pole of each disk magnet facing the south pole of a first adjacent disk magnet and the south pole of each disk magnet facing the north pole of a second adjacent disk magnet. The motor 1108 operates as a conventional magnetic linear motor, with a magnetic force being applied (e.g., automatically or under direction of an operator using an appropriate user interface) to cause the forcer 1110 to move along an axis defined by the disk magnets 1114. The forcer 1110 is associated to a connection member 1112 (which may be configured in accordance with the preceding description of the connection member 612 of FIG. 6), with movement of the forcer 1110 causing corresponding movement of the connection member 1112 and a container support member 1104 associated to the connection member 1112. In the orientation shown in FIG.

11, the position adjustment assembly 1106 causes the container support member 1104 to move vertically, but it should be understood that the position adjustment assembly 1106 may be reconfigured and/or reoriented to cause the container support member 1104 to move horizontally.

Figure 13:
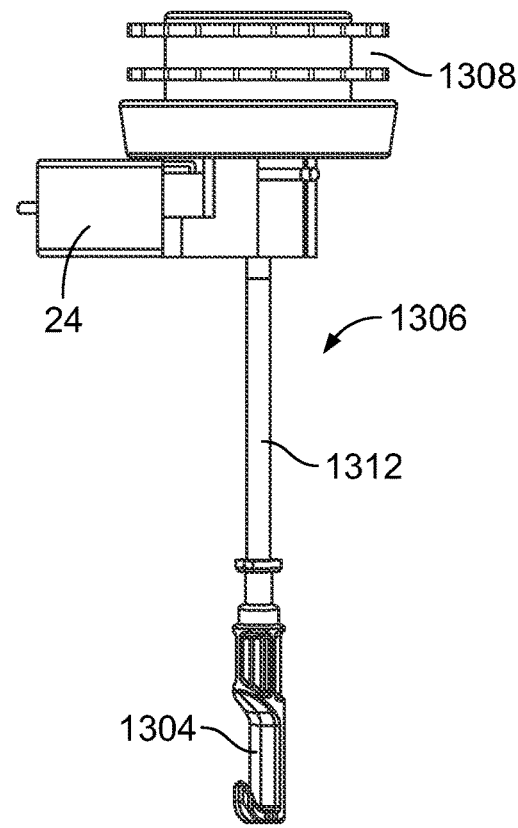
FIG. 13 is a perspective view of another exemplary position adjustment assembly suitable for incorporation into the system of FIG. 3, which includes a telescoping linear actuator.
Figure 14:
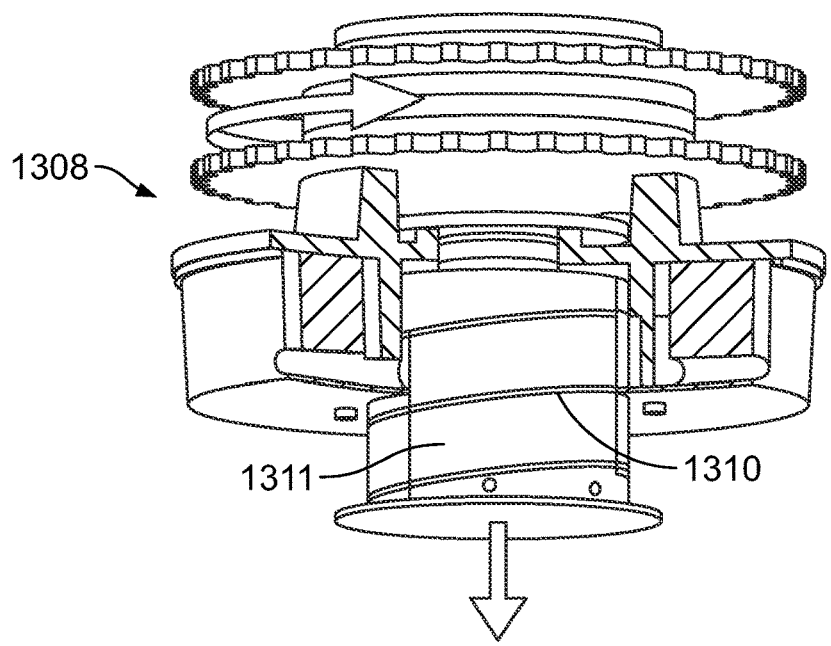
FIG. 14 is a front cross-sectional view of the telescoping linear actuator of the position adjustment assembly of FIG. 13.

FIG. 13 shows a position adjustment assembly 1306 including an adjustment mechanism having a telescoping member 1308, which is shown in greater detail in FIG. 14. The telescoping member 1308 is illustrated as a cylinder comprising a flat band 1310 arranged in a helix, which may move between a collapsed condition and an elongated or extended condition (e.g., either automatically or under direction of an operator using an appropriate user interface). In the collapsed condition, adjacent turns of the band 1310 rest against each other or are spaced closely together, while the adjacent turns of the band 1310 are more greatly spaced apart in the extended condition (or a partially extended condition) for a greater height or length. As the band 1310 is moved from its collapsed condition to its extended condition, a second helical band 1311 is applied between the adjacent turns of the first band 1310 to occupy the space between the adjacent turns of the first band 1310 to provide stability to the resulting cylinder. As the first band 1310 is moved from its extended condition to its collapsed condition, the second band 1311 is removed from between the adjacent turns of the first band 1310 to allow the first band 1310 to fully or partially collapse. The second band 1311 (or at least the portion thereof that has not been applied between adjacent turns of the first band 1310) is stored radially outwardly of the first band 1310, allowing for the telescoping member 1308 to have a small profile when the first band 1310 is in its collapsed condition.

A container support member 1304 is connected to a connection member 1312, which may be configured in accordance with the preceding description of the connection member of FIG. 6. The connection member 1312 is associated to the telescoping member 1308, such that moving the telescoping member 1308 between its collapsed and extended conditions will cause movement (vertical movement, in the orientation of FIG. 13) of the container support member 1304. In an alternative embodiment, the position adjustment assembly 1306 may be reconfigured and/or reoriented to cause the container support member 1304 to move horizontally.

Figure 15:
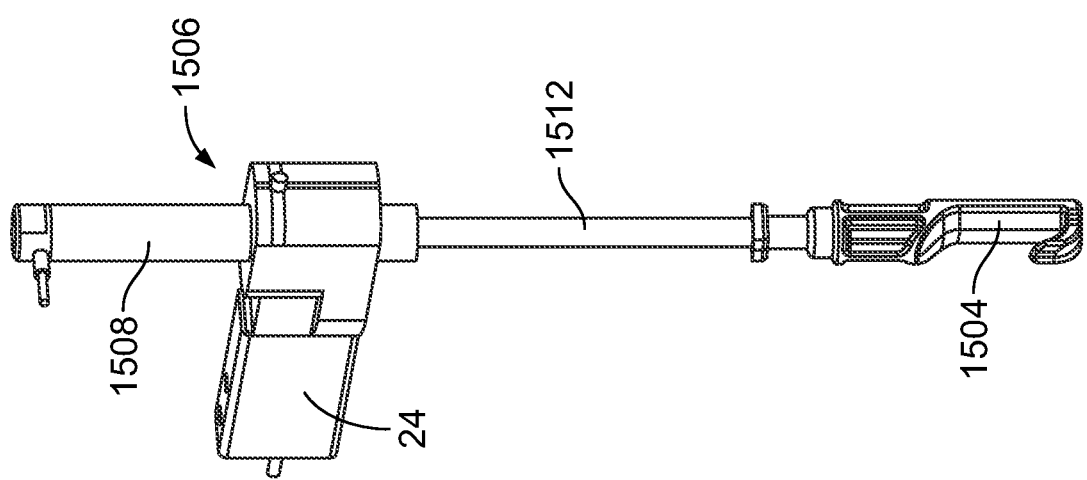
FIG. 15 is a perspective view of another exemplary position adjustment assembly suitable for incorporation into the system of FIG. 3, which includes a piezoelectric linear actuator.

FIG. 15 shows a position adjustment assembly 1506 including an adjustment mechanism having a piezoelectric member 1508, which is at least partially comprised of one or more materials designed to expand or contract with the application of electrical voltage. As voltage is applied to or removed from the piezoelectric member 1508 (e.g., either automatically or under direction of an operator using an appropriate user interface), it will alternately expand or contract. The piezoelectric member 1508 is associated to a connection member 1512 (which may be configured in accordance with the preceding description of the connection member 612 of FIG. 6), which is connected to a container support member 1504, such that expansion and contraction of the piezoelectric member 1508 will cause the connection member 1512 and the container support member 1504 to move. In the orientation of FIG. 15, the position adjustment assembly 1506 causes the container support member 1504 to move vertically, but it should be understood that the position adjustment assembly 1506 may be reconfigured and/or reoriented to cause the container support member 1504 to move horizontally.

Figure 16:
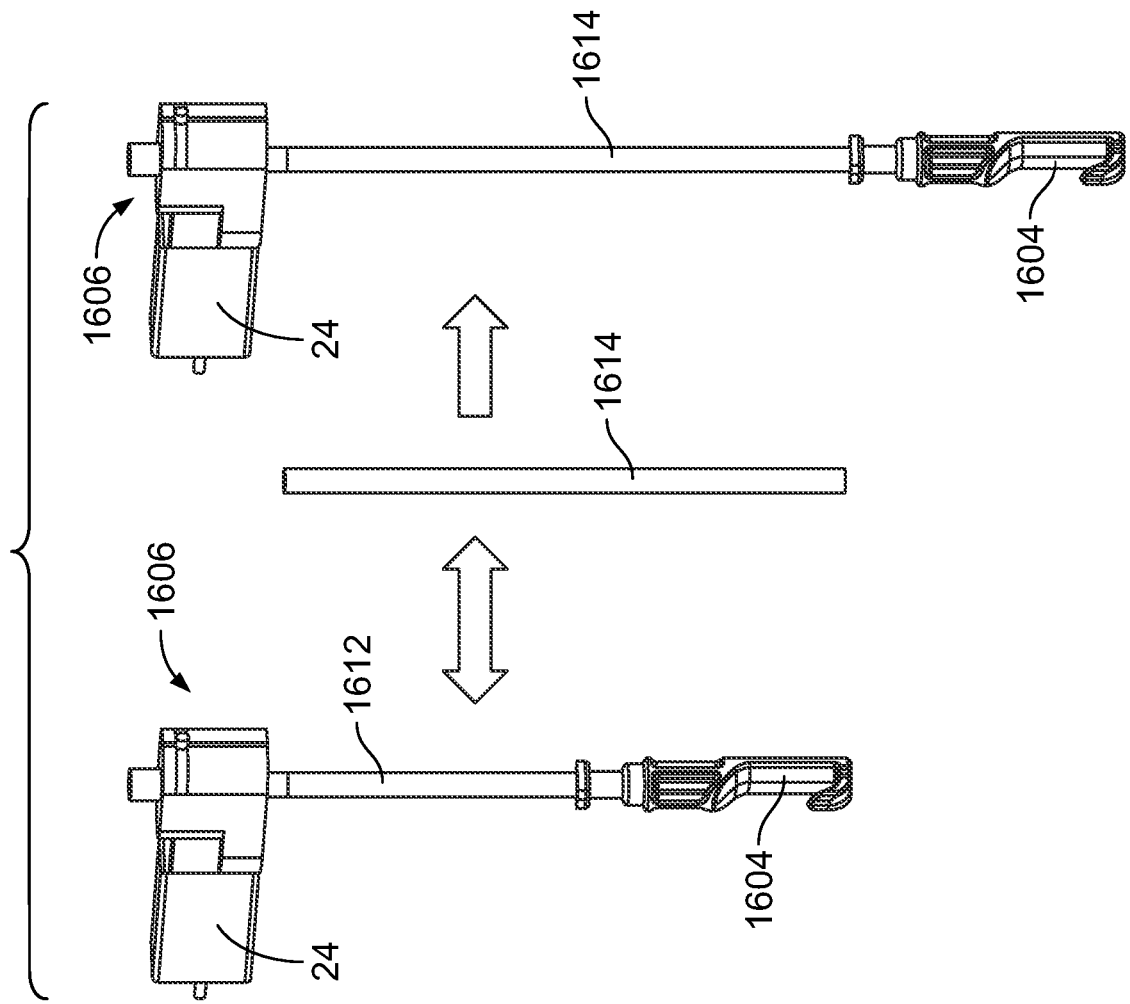
FIG. 16 is a perspective view of yet another position adjustment assembly suitable for incorporation into the system of FIG. 3, which includes a plurality of replaceable rods.

FIG. 16 shows a position adjustment assembly 1606 including a replaceable rod or connection member 1612. The rod 1612 is configured to mate with the system frame (or, more preferably, a weight scale 24 incorporated into the frame) and with a container support member 1604. In the embodiment shown, the rod 1612 is relatively short compared to a second rod 1614. The first rod 1612 is replaced by the second rod 1614 to change the vertical position of the container support member 1604 with respect to the system frame. While FIG. 16 shows two differently configured rods 1612 and 1614, it should be understood that three or more interchangeable, differently configured rods may be provided to allow for the container support member 1604 to be placed into more different positions with respect to the system frame. In other embodiments, rather than one rod being replaced with a differently configured rod, a second rod may be attached to an end of a first rod to extend the effective length of the rod, thereby adjusting the position of the associated container support member. In yet another embodiment, a single collapsible or telescoping rod is provided, with an operator selectively adjusting the length of the rod to vary the position of the associated container support member.

All of the position adjustment assemblies of FIGS. 3-16 are shown in combination with a weight scale 24. It should be understood that adjustment of the position of the container support member relative to the frame may affect the weight registered by the associated weight scale 24. For example, if a shorter rod is replaced by a longer replacement rod (as in the embodiment of FIG. 16), this may affect the weight measured by the weight scale 24 (e.g., if the longer rod is heavier than the shorter rod). To accommodate such variations in the registered weight owing to a change in the weight of the position adjustment assembly, one or more components of the position adjustment assembly may be integrated into the weight scale 24 to provide the weight scale 24 with information regarding the current state of the position adjustment assembly (and the position of the container support member). The weight scale 24 may be configured to account for any change in the registered weight based on the current state of the position adjustment assembly when executing a calibration stage prior to a fluid separation procedure.

Figure 17:
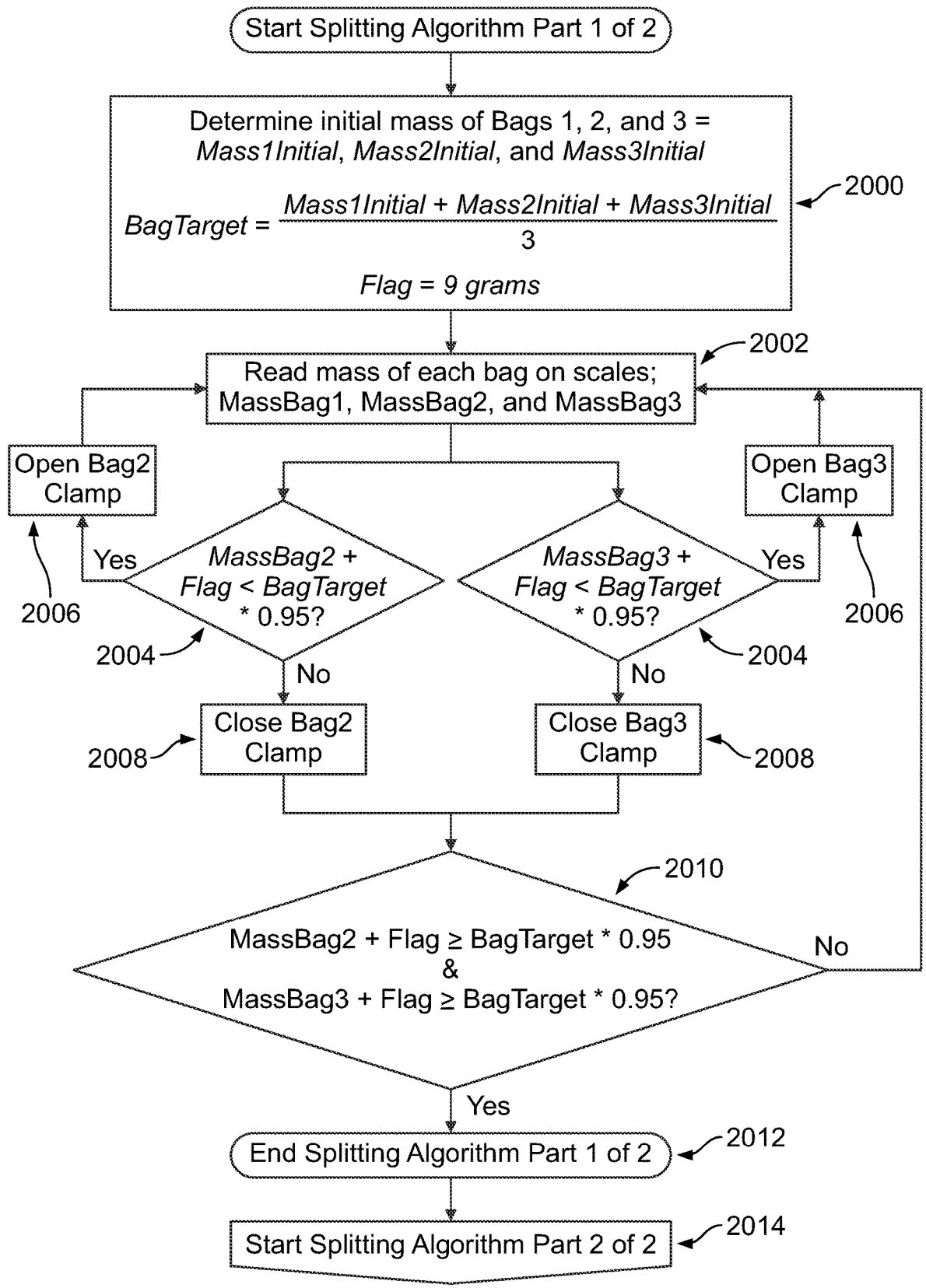
FIG. 17 is a flowchart of a first stage of an exemplary fluid splitting procedure according to an aspect of the present disclosure.
Figure 18A:
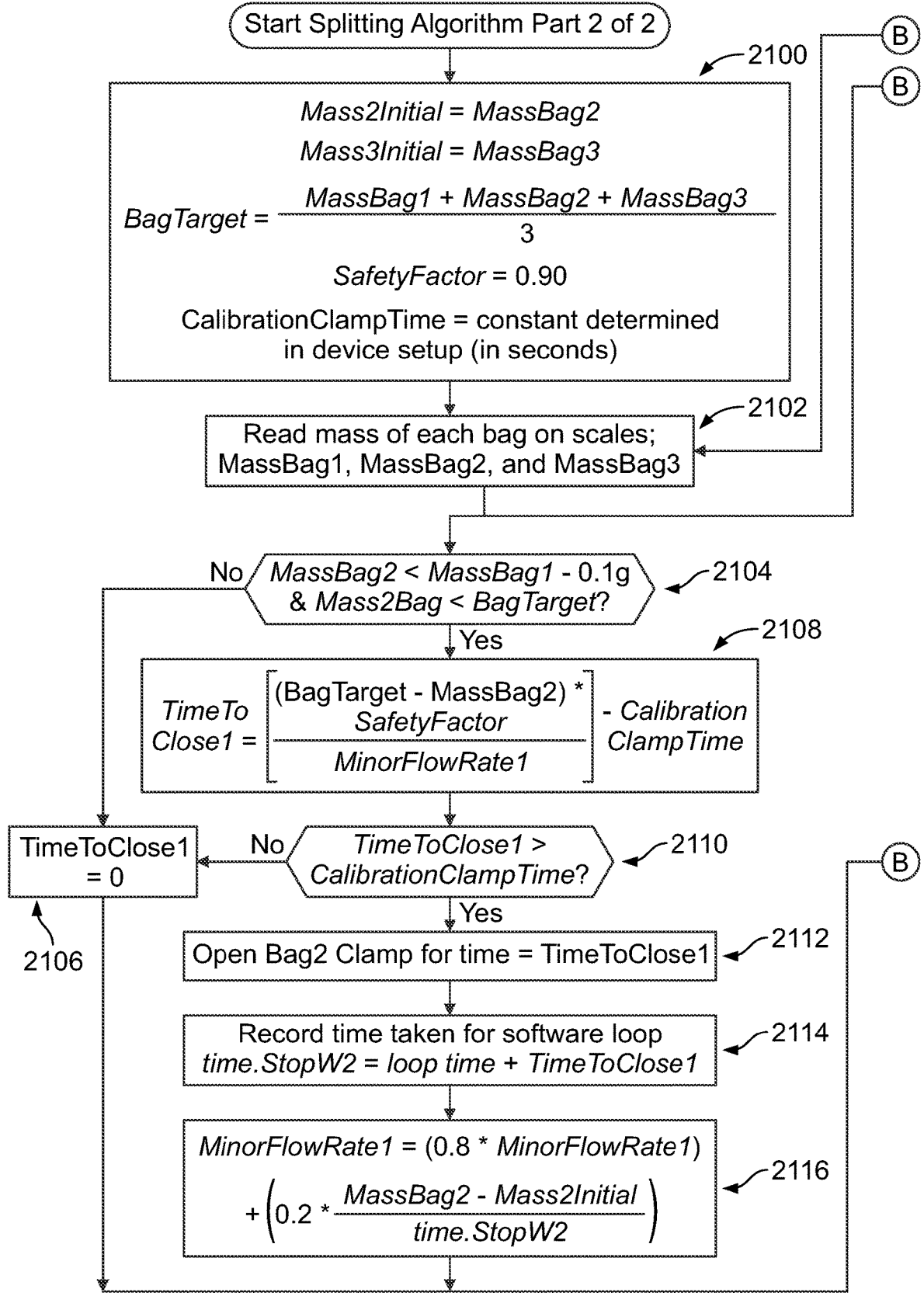
FIGS. 18A and 18B are two halves of a flowchart of a second stage of an exemplary fluid splitting procedure according to an aspect of the present disclosure.
Figure 18B:
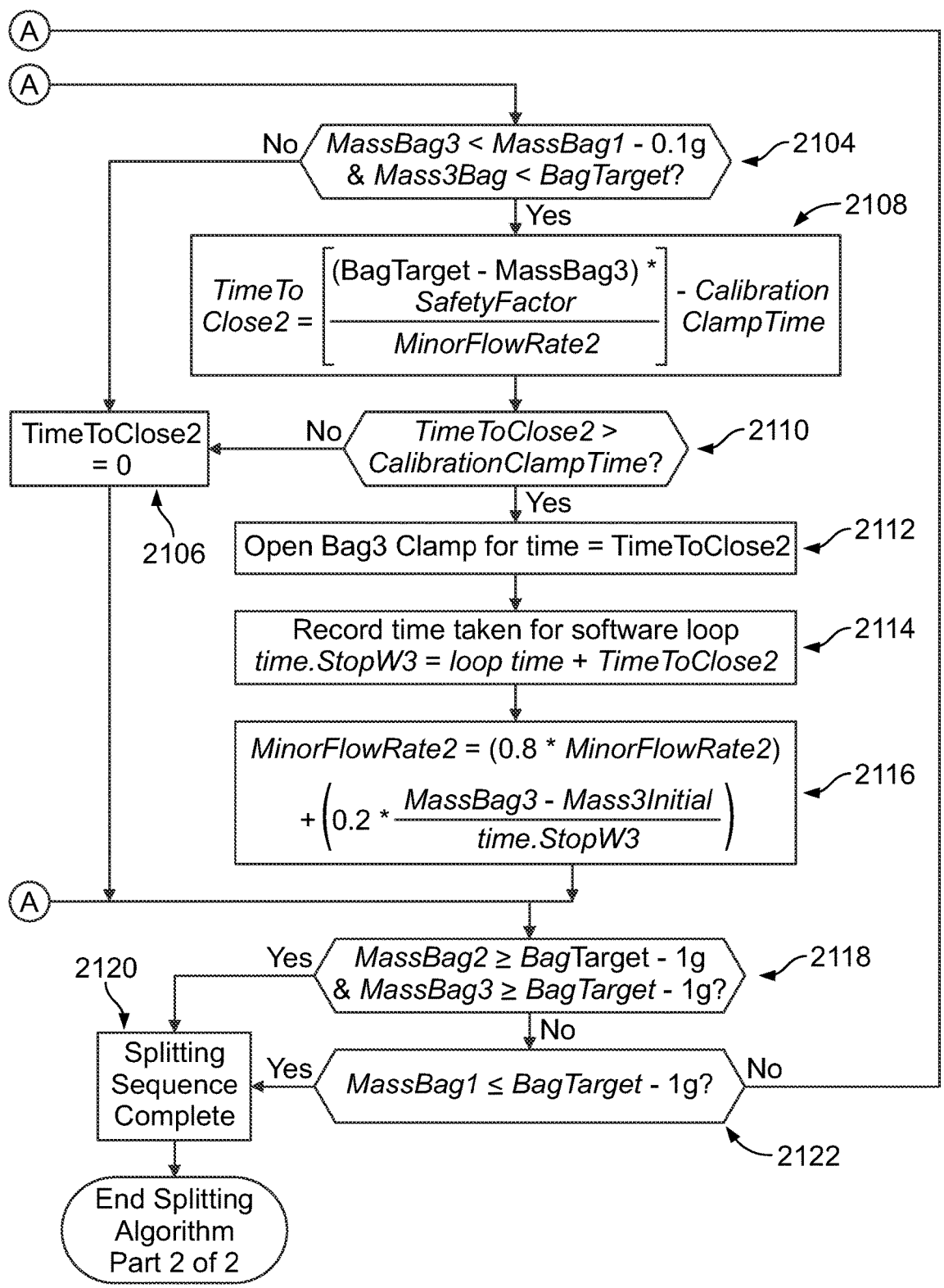

Turning back now to the operation of a system according to the present disclosure, FIGS. 17, 18A, and 18B illustrate an exemplary two-stage fluid splitting procedure. The procedure of FIGS. 17, 18A, and 18B is for a gravity-based system, but it should be understood that the illustrated procedure may be adapted for systems employing a pump system to convey fluid between the various containers of a fluid flow circuit. Additionally, it should be understood that the procedure illustrated in FIGS. 17, 18A, and 18B is exemplary and that systems according to the present disclosure may split a fluid according to other approaches.

The procedure of FIGS. 17, 18A, and 18 is characterized by a first stage in which weights are employed to bring the various containers of a fluid flow circuit close to target weights of the containers and a second stage in which mass balance principles are employed to determine flow rates and accurately achieve target weights or volumes for each container. FIGS. 17, 18A, and 18B illustrate this procedure being applied to a fluid flow circuit having a single source container and two satellite containers, with each container having the same target weight. However, it should be understood that the procedure may be adapted for a fluid flow circuit having a different number of containers and/or different target weights/volumes for two or more of the containers.

In the first stage (FIG. 17), the initial combined weights of each container (which includes the weight of the container itself and the contents of the container) are determined using the various weight scales, as indicated at 2000. In the illustrated embodiment, the initial combined weight of the source container (as measured by the weight scale associated with the source support, which supports the source container) is represented by Mass1Initial, the initial combined weight of a first satellite container (as measured by the weight scale associated with a first satellite support, which supports the first satellite container) is represented by Mass2Initial, and the initial combined weight of a second satellite container (as measured by the weight scale associated with a second satellite support, which supports the second satellite container) is represented by Mass3Initial.

Target weights for each container are also assigned during the step identified in FIG. 17 at 2000. In the illustrated embodiment, each container has the same target weight (BagTarget), such that the target weight for each bag is the average of the initial combined weights:

$$BagTarget = \frac{Mass1Initial + Mass2Initial + Mass3Initial}{3}. \quad (1)$$

While Equation 1 is specific to a procedure in which each container has the same target weight, it should be understood that fluid may be distributed amongst the containers in any ratio without departing from the scope of the present disclosure. For example, if the source container is to contain 40% of the fluid within a fluid flow circuit at the end of a procedure, while a single satellite container is to receive the remainder of the fluid, the initial combined weights of the containers may be added and then multiplied by 0.4 to determine the target weight for the source container and multiplied by 0.6 to determine the target weight for the single satellite container.

Step 2000 of FIG. 17 also identifies a Flag value, which represents a buffer value that may be used during the procedure to ensure that the weight of a satellite bag does not exceed a predetermined percentage of the target weight of that satellite bag during the first stage of the procedure (as will be described in greater detail). Keeping the weights of each satellite container below the predetermined percentage allows the system controller to properly distribute the fluid during the second stage of the procedure (FIGS. 18A and 18B). The buffer value Flag is also useful in view of an inherent lag time or delay between a clamp being instructed to close by the controller and the clamp physically moving to a closed position to stop fluid from flowing into a satellite container.

In the illustrated embodiment, the Flag value is equal to 9 grams, but it should be understood that other weights may be assigned to the Flag value without departing from the scope of the present disclosure. A larger buffer value may be employed to better ensure that the satellite containers are not overfilled during the first stage of the procedure and/or when the lag time of the clamp system is greater. Conversely, if it is acceptable for the weight of a satellite container to be closer to its target weight and/or when the lag time of the clamp system is relatively small, a smaller buffer value may be employed. A larger buffer value adds time to the second stage of the procedure, while reducing the amount of time spent in the first stage. The second stage is used for finer adjustments to the fluid distribution and requires the controller to perform more calculations than the first stage, such that it takes more time to distribute the same amount of fluid during the second stage. As such, the total procedure time may typically be reduced by employing a smaller buffer value (i.e., by decreasing the amount of fluid to be distributed during the second stage), if doing so is consistent with the other goals of the procedure and/or the capabilities of the system. While it should be clear that the use of a buffer value is advantageous, it should also be understood that a procedure may omit a buffer value without departing from the scope of the present disclosure.

With the target weights (and, optionally, the buffer value) determined or assigned in step 2000, the procedure moves to the next step 2002, in which the current weight of each container (which is the combined weight, including the contents of the container) is determined. The current combined weight of the source container (as measured by the source support, which supports the source container) is represented by MassBag1, the current combined weight of the first satellite container (as measured by the weight scale associated with the first satellite support, which supports the first satellite container) is represented by MassBag2, and the current combined weight of the second satellite container (as measured by the weight scale associated with the second satellite support, which supports the second satellite container) is represented by MassBag3. Before the clamp system is actuated by the controller to allow fluid flow out of the source container (as will be described in greater detail), the current weight of each container will be equal to the corresponding initial weight measured during step 2000. However, as will be described in greater detail, multiple cycles may be executed during the first stage of FIG. 17, with the current weight of each container being updated (and typically changing) at the beginning of each cycle.

During the next step 2004, the current weight of each satellite container is compared to the target weight for that container. In particular, the controller determines whether the current weight of a satellite container is less than a selected percentage of the target weight. As described above, the weight of a satellite container at the end of the first stage must be less than the target weight for that container to allow the second stage to accurately distribute fluid to the container. By comparing the current weight (MassBag2 or MassBag3 in the illustrated embodiment) to a percentage of the target weight for that container, it is better ensured that the current weight remains below the target weight. If a buffer value is employed, as described above, the sum of the current weight of the satellite container and the buffer value may be compared to a percentage of the target weight for the container, as in below Equation 2 for the first satellite container and below Equation 3 for the second satellite container:

$$MassBag2+Flag<BagTarget*0.95 \quad (2), and$$

$$MassBag3+Flag<BagTarget*0.95 \quad (3).$$

In Equations 2 and 3, a multiplier of 0.95 (i.e., a percentage of 95%) is applied to the target weight of each satellite container, but it should be understood that a different multiplier may be employed, which may include different multipliers being used in Equations 2 and 3. A larger multiplier will allow the current weight of a satellite container to get closer to the target weight for that satellite container before the end of the first stage of the procedure, while a smaller multiplier will end the first stage with a greater difference between the current weight of the satellite container and the target weight for that satellite container.

For each satellite container, if the controller confirms that the inequality of step 2004 is satisfied (i.e., when the current weight of the satellite container is sufficiently lower than the target weight for that container), then the controller (in a step identified in FIG. 17 at 2006) controls the clamp system to allow fluid flow from the source container to that satellite container and the procedure loops back to step 2002. The cycle of measuring and updating the current weight of the satellite container (step 2002) and comparing the current weight (and the buffer value, if provided) to a selected percentage of the target value for the satellite container (while the clamp system allows fluid flow to the satellite container) is repeated until the inequality of step 2004 is not satisfied (i.e., when the current weight of the satellite container (factoring in the buffer value, if employed) is greater than the predetermined percentage of the target value for the satellite container).

When the inequality of step 2004 is not satisfied, the controller commands the clamp system to prevent fluid flow to the satellite container (as identified in step 2008 of FIG. 17) and the controller compares the current weight of each satellite container to the target weight for that satellite container using a different inequality (in step 2010). In particular, the controller determines whether the sum of the current weight of a satellite container and the buffer value is greater than or equal to a selected percentage of the target weight for that satellite container, as in below Equation 4 for the first satellite container and below Equation 5 for the second satellite container:

$$\text{MassBag2} + \text{Flag} \geq \text{BagTarget} * 0.95 \quad (4), \text{ and}$$

$$\text{MassBag3} + \text{Flag} \geq \text{BagTarget} * 0.95 \quad (5).$$

In Equations 4 and 5, the same percentage (95% or a 0.95 multiplier) is used in steps 2004 and 2010, which effectively determines whether the current weight of a satellite container is less than and within a predetermined percentage of the target weight for that satellite container. In one embodiment, in which the buffer value is 9 grams, the target weight for each container is 200 grams, and the multiplier used in steps 2004 and 2010 is 0.95, that predetermined percentage will be approximately 90% (because a current weight of 181 grams, which is 90.5% of the target weight, will be the lowest current weight that will satisfy the inequality of step 2010). It should be understood that different values may be employed during the first stage to bring the current weight of each satellite container to within some other predetermined percentage of the target weight for that satellite container.

When the inequality of step 2010 is not satisfied (i.e., if the current weight of a satellite container is not sufficiently close to the target weight for that satellite container), the procedure will loop back to step 2002 (as represented in FIG. 17 by a "NO" determination) and the illustrated cycle will be repeated until the inequality of step 2010 is satisfied. When the inequality of step 2010 is satisfied for each satellite container, the first stage of the procedure ends (step 2012) and the second stage of the procedure begins (as represented in FIG. 17 at step 2014).

Notably, the first stage of the procedure does not end when the current weight of each satellite container reaches a particular value, but when the current weight of each satellite container is within a particular range of values (i.e., a weight that is less than and within a predetermined percentage of the target weight for that satellite container). This is because the first stage is intended to more quickly approach the target weight for each satellite container, rather than more accurately and slowly fine-tuning the fluid distribution (which is done in the second stage).

At the beginning of the second stage (FIG. 18A), the system controller resets (in step 2100) the values of Mass2Initial and Mass3Initial to be equal to the current weight of the respective satellite container:

$$\text{Mass2Initial} = \text{MassBag2} \quad (6), \text{ and}$$

$$\text{Mass3Initial} = \text{MassBag3} \quad (7).$$

The controller may (as a double check) also recalculate the target weight (BagTarget) for each container in step 2100. In the illustrated embodiment, the target weight is the same for each container, such that the target weight for each container is equal to the average:

$$\text{BagTarget} = \frac{\text{MassBag1} + \text{MassBag2} + \text{MassBag3}}{3}, \quad (8)$$

but (as described above) may be some other target weight.

Two other values are also assigned during step 2100. SafetyFactor is a reduction factor that is used during the second stage to ensure that a satellite container is not overfilled (as will be explained in greater detail), while CalibrationClampTime is a lag time equal to the time between the controller commanding the clamp system to prevent fluid flow to a satellite container and the time when fluid flow is actually prevented. In the illustrated embodiment, a SafetyFactor value of 0.90 is used, though other values may be used, with the value being decreased to further reduce the risk of overfilling a satellite container or increased (closer to 1) if overfilling a satellite container is less of a concern (e.g., if a pump system is employed) and/or if a shorter procedure time is required. As for CalibrationClampTime, it is entirely dependent on the particular configuration of the system, the controller, and the clamp system, but may typically be on the order of 0.075 seconds.

With the target weights and other values determined or assigned in step 2100, the procedure moves to the next step 2102, in which the current weight of each container is determined, as in step 2002 of the first stage (FIG. 17). Before the clamp system is actuated by the controller to allow additional fluid flow out of the source container (as will be described in greater detail), the current weight of each container will be equal to the corresponding weight at the end of the first stage. However, as will be described in greater detail, multiple cycles may be executed during the second stage of FIGS. 18A and 18B, with the current weight of each container being updated (and typically changing) at the beginning of each cycle.

During the next step 2104, the current weight of each satellite container is compared to the current weight of the source container and to the target weight for that container. In the embodiment of FIGS. 18A and 18B, the following equations are used to assess the first satellite container:

$$\text{MassBag2} < \text{MassBag1} - 0.1 \text{ gram} \quad (9), \text{ and}$$

MassBag2<BagTarget (10), with similar equations being used to assess the second satellite container.

In Equation 9, the weight of the satellite container is compared to the difference between the weight of the source container and a threshold value, which is 0.1 gram in the illustrated embodiment. It should be understood that Equation 9 (and the general concept of comparing the weight of a satellite container to the weight of the source container) is used in the specific case of the target weight of the satellite container being the same as the target weight of the source container, as the relative weights of the two containers is not necessarily a factor for other fluid distribution schemes. Additionally, the threshold value (which assures that the satellite container weighs less than the source container) is specific to a gravity based approach, as it is more important in such a system than in a pump-based approach to prevent overfilling of the satellite containers. Accordingly, step 2104 should be understood as a step in which the controller determines whether the weight of a satellite container is sufficiently low that fluid flow from the source container to the satellite container is appropriate, with the particular weights that are compared varying depending on the target fluid distribution, although Equation 10 may be universally applicable to determine whether a satellite container has reached its target weight.

When step 2104 indicates that fluid flow from the source container into a satellite container is not required or appropriate (as represented in FIGS. 18A and 18B by a "NO" determination in which at least one of the inequalities of step 2104 is not satisfied), the controller commands the clamp system to prevent fluid flow to the satellite container (as indicated in step 2106) and the procedure proceeds to carry out final verification steps to determine whether it is appropriate to end the procedure, as will be described in greater detail.

On the other hand, when step 2104 indicates that fluid flow from the source container into a satellite container is required or appropriate (as represented in FIGS. 18A and 18B by a "YES" determination in which both of the inequalities of step 2104 are satisfied), the controller proceeds to step 2108 in which it determines how long to allow fluid flow from the source container to the satellite container. This amount of time is represented in FIG. 18A by the TimeToClose1 value (for the first satellite container) and in FIG. 18B by the TimeToClose2 value (for the second satellite container). The amount of time may be variously determined without departing from the scope of the present disclosure, but in the illustrated embodiment, the following equation is used for the first satellite container:

$$TimeToClose1 = \left[\frac{(BagTarget - MassBag2)*SafetyFactor}{MinorFlowRate1}\right] - CalibrationClampTire, \quad (11)$$

while a similar equation is used for the second satellite container.

In Equation 11, the difference between the target weight for a satellite container and the current weight of the satellite container is multiplied by the SafetyFactor value of step 2100. This product is then divided by MinorFlowRate1 (which is the rate at which fluid will flow from the source container to the satellite container if the controller were to command the clamp system to allow such fluid flow), with CalibrationClampTime from step 2100 being subtracted from the quotient.

The difference between the target weight for the satellite container and the current weight of the satellite container is the amount of fluid that still needs to be conveyed into the satellite container. Dividing that value by the flow rate of fluid into the satellite container (i.e., MinorFlowRate1) would give the time required for the satellite container to be filled to its target weight, assuming a uniform flow rate. Multiplying by the SafetyFactor value, as in Equation 11, calculates the amount of time required to fill the satellite container to a point below the target weight, which may be advantageous to ensure that the satellite container is not overfilled (which is a particular concern for a gravity based system) if the flow rate is improperly calculated. In the illustrated embodiment, in which the SafetyFactor value is 0.90, the SafetyFactor causes the calculated value to be equal to 90% of the time required to fill the satellite container to its target weight. For example, if MassBag2 is 181 grams, BagTarget is 200 grams, and MinorFlowRate1 is 1 g/s, it would take 19 seconds (assuming a constant flow rate) to fill the satellite container to its target weight. Multiplying 19 seconds by the SafetyFactor value of 0.90 gives a product of 17.1 seconds, which duration of fluid flow would bring the weight of the satellite container to approximately 198.1 grams (assuming a constant flow rate).

In a gravity based system, the flow rate will depend on a number of factors, including the difference in elevation between the supports of the source container and the satellite container, along with the amount of fluid in the source container. While the elevations of the supports will not tend to change during a procedure, the weight of the source container will decrease as the procedure continues, which causes a change (namely, a decrease) in the flow rate as the procedure continues. Thus, as will be explained in greater detail, it may be advantageous to repeatedly calculate the flow rate. However, the first time that step 2108 is executed, MinorFlowRate1 may be equated to the rate at which fluid was flowing from the source container to the satellite container just before such fluid flow was prevented at the end of the first stage of the procedure (because the weight of the source container is the same at the end of the first stage and the beginning of the second stage). The flow rate may be variously determined without departing from the scope of the present disclosure, but in one embodiment, the flow rate may be calculated based on the rate at which the weight of the satellite container changes.

Finally, subtracting CalibrationClampTime from the calculated flow time to arrive at TimeToClose1 in Equation 11 adjusts the calculated flow time in view of the lag time between the controller commanding the clamp system to prevent fluid flow to a satellite container and the time when fluid flow is actually prevented. Thus, if a flow time of 17.1 seconds is calculated (as in the above example) and the lag time is known to be 0.075 seconds (as in a preceding example), TimeToClose1 will be calculated as 17.025 seconds. This effectively results in a fluid flow time of 17.1 seconds because fluid flow will continue for an additional 0.075 seconds (equal to the lag time of the clamp system) after the controller has commanded the clamp system to prevent fluid flow to the satellite container. Again, it should be understood that Equation 11 is merely exemplary and that step 2108 represents the determination of the amount of time to allow fluid flow from the source container to a satellite container.

The calculated time to allow fluid flow to the satellite container (TimeToClose1 or TimeToClose2 in FIGS. 18A and 18B) is then compared (in step 2110) to the clamp system lag time (CalibrationClampTime). When the calculated time is less than the lag time (i.e., when it would be impossible for the clamp system to allow and then prevent fluid flow quickly enough), a value of zero is assigned to the calculated time (as indicated in step 2106 of FIGS. 18A and 18B), which prevents fluid flow from the source container to the satellite container. With the calculated flow time being set to zero, the procedure proceeds to carry out final verification steps to determine whether it is appropriate to end the procedure, as will be described in greater detail.

On the other hand, when the calculated time is greater than the lag time (as represented in FIGS. 18A and 18B by a "YES" determination), the controller proceeds (in step 2112) to command the clamp system to allow fluid flow from the source container to the satellite container for a time equal to the calculated fluid flow time (TimeToClose1 for the first satellite container and TimeToClose2 for the second satellite container) and to then prevent further fluid flow.

The controller then (in step 2114) calculates the total time required to complete a cycle of allowing and then preventing fluid flow for each satellite container. In FIG. 18A, this time is represented for the first satellite by time.StopW2, which is calculated as:

time.StopW2=loop time+TimeToClose1 (12), while a similar equation is used to calculate a time.StopW3 for the second satellite container (FIG. 18B).

In Equation 12, loop time is the time required to complete a software loop, which may be on the order of 0.1 second, but will depend on any of a number of factors, including the nature of the controller and the complexity of the system. Thus, time.StopW2 is the total time required to complete a cycle of allowing and then preventing fluid flow into the first satellite container (i.e., the sum of the time during which fluid flow is allowed and the time required to complete the associated calculations). Similarly, time.StopW3 is the total time required to complete a cycle of allowing and then preventing fluid flow into the second satellite container. Thus, in the exemplary embodiment in which loop time is 0.1 second and TimeToClose1 is 17.025 seconds, time.StopW2 is calculated to be 17.125 seconds.

The controller then (in step 2116) recalculates the flow rate for each satellite container (MinorFlowRate1 for the first satellite container and MinorFlowRate2 for the second satellite container in the embodiment of FIGS. 18A and 18B). This is necessary in a gravity based system because the flow rate will decrease for each cycle, due to there being less and less fluid in the source container as the fluid flows from the source container to the satellite container(s). The flow rate may be calculated according to any suitable approach, which may include comparing the rate at which the weight of the satellite container was changing leading up to the time that fluid flow into the satellite container was most recently prevented. However, in the illustrated embodiment, the current flow rate for the first satellite container is calculated using the following equation:

$$MinorFlowRate1 = (0.8 * MinorFlowRate1) + \left(0.2 * \frac{MassBag2 - Mass2Initial}{time.StopW2}\right), \quad (13)$$

with a similar equation being used to calculate the fluid flow rate for the second satellite container.

Equation 13 decreases the most recently calculated flow rate by 20% (MinorFlowRate1 multiplied by 0.8) and then adds a factor related to the change in weight of the satellite container since the beginning of the second stage (MassBag2-Mass2Initial) and the total time of the current cycle (time.StopW2). In particular, the change in weight of the satellite container is divided by the total time of the current cycle, with the quotient being multiplied by 0.2 to arrive at the factor. In the exemplary embodiment, in which MinorFlowRate1 is initially 1 g/s, the change in weight of the first satellite container is approximately 17.1 grams (198.1 grams-181 grams), and the total time of the current cycle is 17.125 seconds, MinorFlowRate1 will be recalculated to be approximately 0.9997 g/s. This example assumes a uniform flow rate during the cycle which, as explained above, will not be the case for a gravity based system. As flow rate will tend to decrease during a cycle, the change in weight of the satellite container will tend to be lower than it would be if flow rate were uniform. For example, if the change in weight of the satellite container were only 16 grams instead of 17.1 grams (due to flow rate decreasing during a cycle), then MinorFlowRate1 would be recalculated to be approximately 0.9869 g/s. In practice, it has been found that approximately twenty cycles may be required to complete the second stage of the procedure, with flow rates beginning at approximately 1 g/s at the beginning of the second stage and decreasing to approximately 0.8 g/s at the end of the procedure. In general, the flow rate will decrease more quickly during the earlier cycles, while decreasing more slowly during the later cycles.

The controller then proceeds (in step 2118) to compare the current weights of the satellite containers to their target weights. In the illustrated embodiment, the controller determines whether the current weight of a satellite container is within a predetermined amount of its target weight. For the first satellite container, the following equation is used:

MassBag2 BagTarget−1 gram (14), with a similar equation being used to check the weight of the second satellite container.

In Equation 14, a predetermined amount or weight of 1 gram is used, which means that the inequality is satisfied if the current weight of the satellite container is within 1 gram of its target weight. A different predetermined amount or weight may be used, depending on how close to the target weight that the current weight of the satellite container is desired to be. A larger amount or weight will allow for a quicker, less precise procedure, while a smaller amount or weight will result in a slower, but more accurate procedure. In practice, it has been found that a threshold of 1 gram may be appropriate for a platelet splitting procedure having target weights on the order of 200 grams, as 1 gram is relatively low (within 0.5% of the target weight) and the improved accuracy resulting from a lower threshold amount may not justify the increased procedure time.

If the inequalities of step 2118 are satisfied (i.e., if the weight of each of the satellite containers is sufficiently close to the respective target weight, as represented in FIG. 18B by a "YES" determination), then the procedure ends (as indicated in FIG. 18B at step 2120). On the other hand, if at least one of the inequalities is not satisfied (i.e., if the weight of at least one of the satellite containers is not sufficiently close to its target weight, as represented in FIG. 18B by a "NO" determination), then the procedure may move to step 2122.

In step 2122, the current weight of the source container is compared to the target weight of the source container. In the illustrated embodiment, the controller checks whether the current weight of the source container is within a predetermined amount (which may be the same amount used in step 2118) of its target weight:

$$\text{MassBag1} \leq \text{BagTarget} - 1 \text{ gram} \quad (15).$$

It will be seen that (in step 2118) the weight of a satellite container is compared to the sum of its target weight and the threshold value, while (in step 2122) the weight of the source container is compared to the difference of its target weight and the threshold value. This is because the procedure illustrated in FIGS. 18A and 18B is a gravity based system, which must ensure that too much fluid has not been removed from the source container and that too much fluid has not been conveyed into any of the satellite containers. In a pump-based system, different comparisons may be made to ensure that the current weights of the containers are sufficiently close to their target weights (e.g., checking the current weight of a container against the target weight plus or minus the threshold value).

If the inequality of step 2122 is not satisfied (i.e., if too much fluid remains in the source container, as represented in FIG. 18 by a "NO" determination), the controller will loop back to step 2102 and allow for additional fluid flow out of the source container. On the other hand, if the inequality of step 2122 is satisfied (i.e., if the fluid level in the source container is sufficiently low and close enough to its target weight, as represented in FIG. 18B by a "YES" determination), the controller will proceed to step 2120 and end the procedure. In this case, the weight of at least one of the satellite containers is not as close to its target weight as would be desired, but will have to suffice, as the fluid level in the source container is low enough that additional fluid flow out of the source container is not desired. In an alternative embodiment, the weight of the source container may be compared to a different (e.g., smaller) threshold value than is used for the satellite containers and/or the weight of the source container may be allowed to drop slightly below the target weight in order to bring the weight of a satellite container closer to its target weight. This may be more preferable for a pump-based system than a gravity based system, as fluid can more easily be returned to the source container from a satellite container, if necessary.

After the procedure is ended, the containers may be heat sealed (e.g., using a sealer incorporated into the system or separately provided) and removed from their associated supports.

Figure 20:
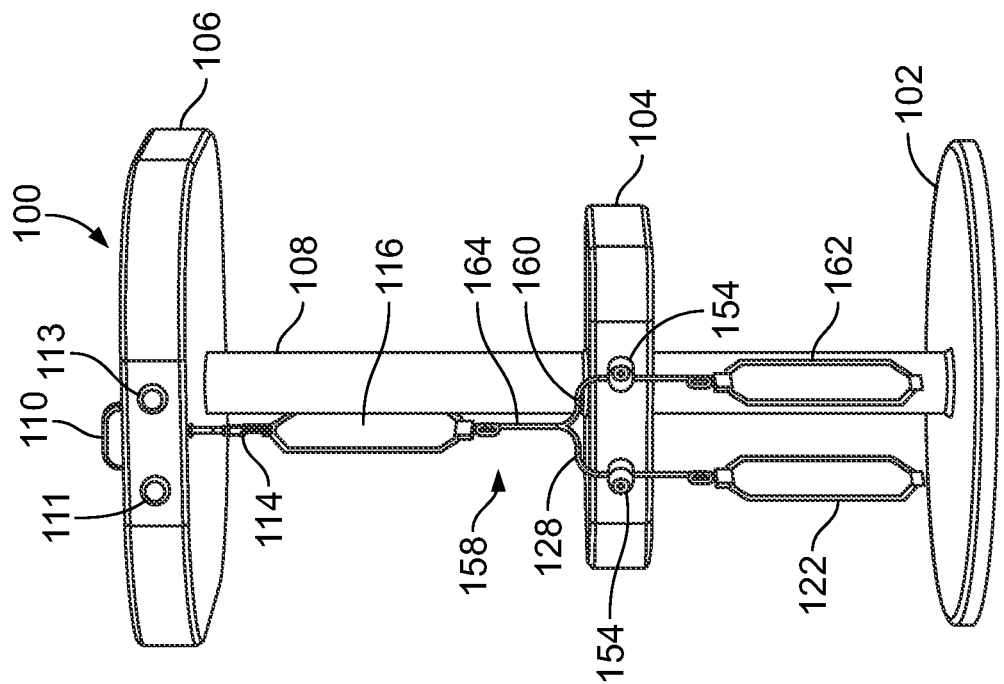
FIG. 20 is a perspective view of the system for splitting a fluid of FIG. 19, with a fluid flow circuit mounted thereon.
Figure 19:
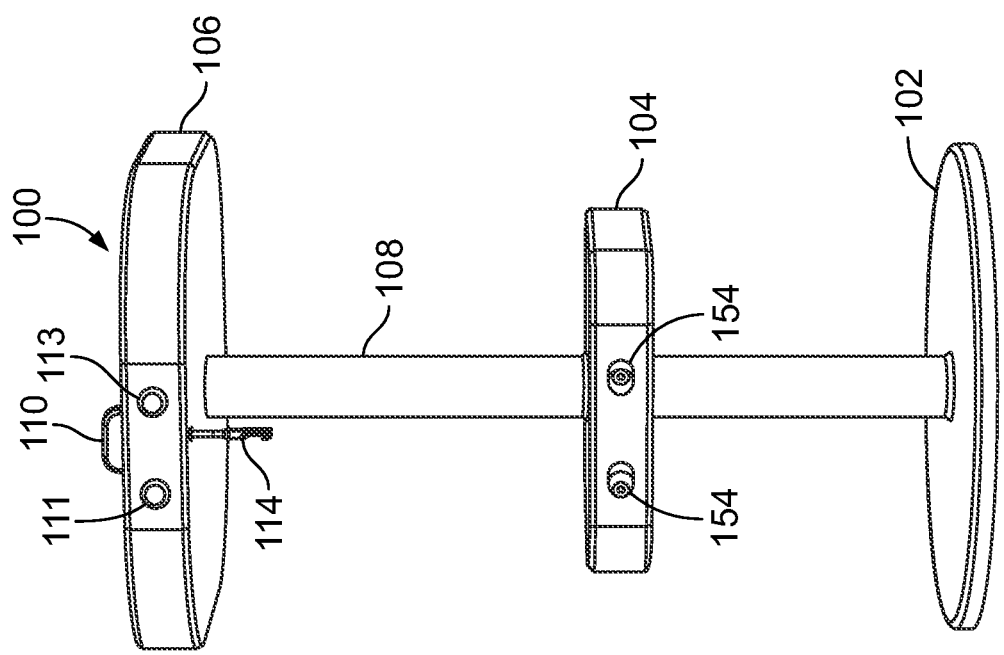
FIG. 19 is a perspective view of another exemplary embodiment of a system for splitting a fluid, according to an aspect of the present disclosure.

An additional embodiment of a fluid splitting system according to the present disclosure is illustrated in FIGS. 19 and 20. The system 100 of FIGS. 19 and 20 is configured and operates similarly to the system 10 of FIG. 1 and the system 50 of FIG. 2, except for some notable differences that will be described in greater detail. Indeed, unless otherwise noted, the features and operation of systems 10 and 50 from the foregoing description are also applicable to system 100 of FIGS. 19 and 20, while the preceding description of the configurations of the exemplary fluid flow circuits 18 and 58 associated to systems 10 and 50 are similarly applicable to the fluid flow circuit 158 of FIG. 20, unless stated to the contrary.

The illustrated system 100 includes a base 102 and central column 108 extending upwardly from the base 102. The central column may be fixedly secured or integrally formed with the base or may instead be rotatably associated to the base. If the central column 108 is rotatably associated with the base 102, the system may utilize a drive system associated with a controller of the system that is configured to rotate the central column with respect to the base. While FIGS. 19 and 20 illustrate a substantially circular base 102 and a substantially cylindrical central column 108, it should be understood that the base and central column may be variously configured without departing from the scope of the present disclosure. The sizes and shapes of the base 102 and central column 108 may depend on the configurations of the fluid flow circuits to be accommodated by the system 100, with larger fluid flow circuits requiring a taller central column 108 than smaller fluid flow circuits, for example. Depending on the size and configuration of the fluid flow circuits to be accommodated by the system 100, the base 102 may be configured to be positioned on a floor or on some other support surface (e.g., a table or countertop). In one embodiment, the base 102 may include wheels or rollers or casters or the like for moving the system 100 from one location of a floor or support surface to another, akin to an IV pole.

The system 100 additionally includes a lower support frame 104 and upper support frame 106, both extending outwardly from the central column 108. In the illustrated embodiment, the upper support frame and the lower support frame are generally square platforms with four outwardly facing surfaces joined by rounded corners. However, it should be understood that the configurations of the lower and upper support frames 104 and 106 may vary without departing from the scope of the present disclosure. In one embodiment, the base 102, central column 108, upper support frame 106 and/or lower support frame 104 may be at least partially formed of a metallic or plastic material or some other rigid material.

FIG. 20 illustrates a fluid flow circuit 158 mounted to the system 100, including a source container 116 (suspended from the upper support frame), satellite containers 122 and 162 (suspended from the lower support frame), and fluid conduits 164, 128 and 160. In contrast to the fluid flow circuits 18 and 58 of FIGS. 1 and 2, in which conduits connect to ports on the bottom of the satellite containers 22 and 62, it should be noted that conduits 128 and 160 connect to ports on the top of satellite containers 122 and 162 (respectively). Such a configuration (in which the port is positioned at the top of the satellite container) may be advantageous, especially for gravity-based flow systems due to flow from the source container to the satellite container being smoother, while also allowing for the satellite container to be more easily purged of air (e.g., by squeezing) compared to a configuration in which fluid flows into the bottom of the satellite container. However, it is within the scope of the present disclosure for the port to be at a different location of the satellite containers and the conduits to therefore be connected at a different location of the satellite container. Indeed, it should be understood that the fluid flow circuit 158 shown in FIG. 20 is merely exemplary and that systems according to this aspect of the present disclosure may be configured to accommodate differently configured fluid flow circuits.

Turning back now to the system, it includes at least a source support 114, a satellite support 154, a weight scale associated with each support, and a controller. The source support is configured to support the source container 116 of a fluid flow circuit 158, while each satellite support 154 is configured to support a satellite container 122, 162 of the fluid flow circuit 158 (as shown in FIG. 20). As described above, in a typical fluid splitting procedure, a portion of a high volume fluid will flow from the source container into each satellite container, in which case it may be advantageous (particularly when fluid flows by gravity, rather than being pumped) for the source support to be associated with the upper support frame, while the satellite supports are associated with the lower support frame (as illustrated) to position the tops of the satellite containers at a lower elevation than the bottom of the source container. By such a configuration, fluid may be conveyed from the source container to the satellite containers (e.g., via gravity). In the illustrated embodiment, the satellite supports are configured to position their associated satellite containers at the same elevation. In another embodiment, the satellite supports may be configured differently so as to cause the satellite containers to be positioned at different elevations, each preferably below the source container.

In the illustrated embodiment, the source support is associated with the upper support frame, extending from a lower surface of the upper support frame, while the pair of satellite supports are associated with the lower support frame, extending from the same outwardly facing surface of the lower support frame. The first satellite support 154 is offset to the left of the source support and the second satellite support 154 is offset to the right of the source support. Such a configuration allows for the conduit 164 connected to the source container to extend downwardly, with conduit 128 extending from the bottom of conduit 164 to the left to be received by the first satellite support 154, while conduit 160 extends from the bottom of conduit 164 to the right to be received by the second satellite support 154. While such a configuration may be advantageous for use with the illustrated fluid flow circuit, it should be understood that a different configuration may be more suitable for use with a differently configured fluid flow circuit.

As noted above, the source support 114 is configured to support the source container 116 of a fluid flow circuit 158. The source support may be configured as described above with respect to the source supports of systems 10 and 50, with similar operation and design. For example, in the illustrated embodiment, the source container is configured as a flexible bag having an upper opening or aperture. In this case, the source support may include or be configured as a hook or hanger, which includes a portion that extends into and through the upper opening or aperture of the associated source container to support and suspend the source container at some elevation. The position of the source support with respect to the upper support frame may be varied, such as by using a position adjustment assembly of the type described herein.

Regardless of the particular configuration of the source support, it includes an associated weight scale (which may include a load cell, for example) configured to measure a combined weight of the source container (i.e., the tare weight) and the contents of the source container, as described above in relation to the weight scales of systems 10 and 50.

As for the satellite support, systems according to this aspect of the present disclosure include at least one, with the illustrated embodiment having two satellite supports 154. As noted above, each satellite support is configured to support a satellite container of the fluid flow circuit mounted to the fluid-splitting system. If a system includes a plurality of satellite supports, it may be preferable for all of the satellite supports to be similarly configured (as the satellite containers and associated conduits of a fluid flow circuit will typically be similarly configured), though it is within the scope of the present disclosure for at least two satellite supports of a system to be differently configured. As will be described, the satellite support does not directly contact the satellite container that it supports, so a single satellite support may be suitable for use with differently configured satellite containers. Instead, the satellite support will interact with a conduit extending from the associated satellite container (as will be described), such that the particular configuration of the conduit is a greater consideration than the configuration of the satellite container when selecting an appropriate satellite support.

Figure 21:
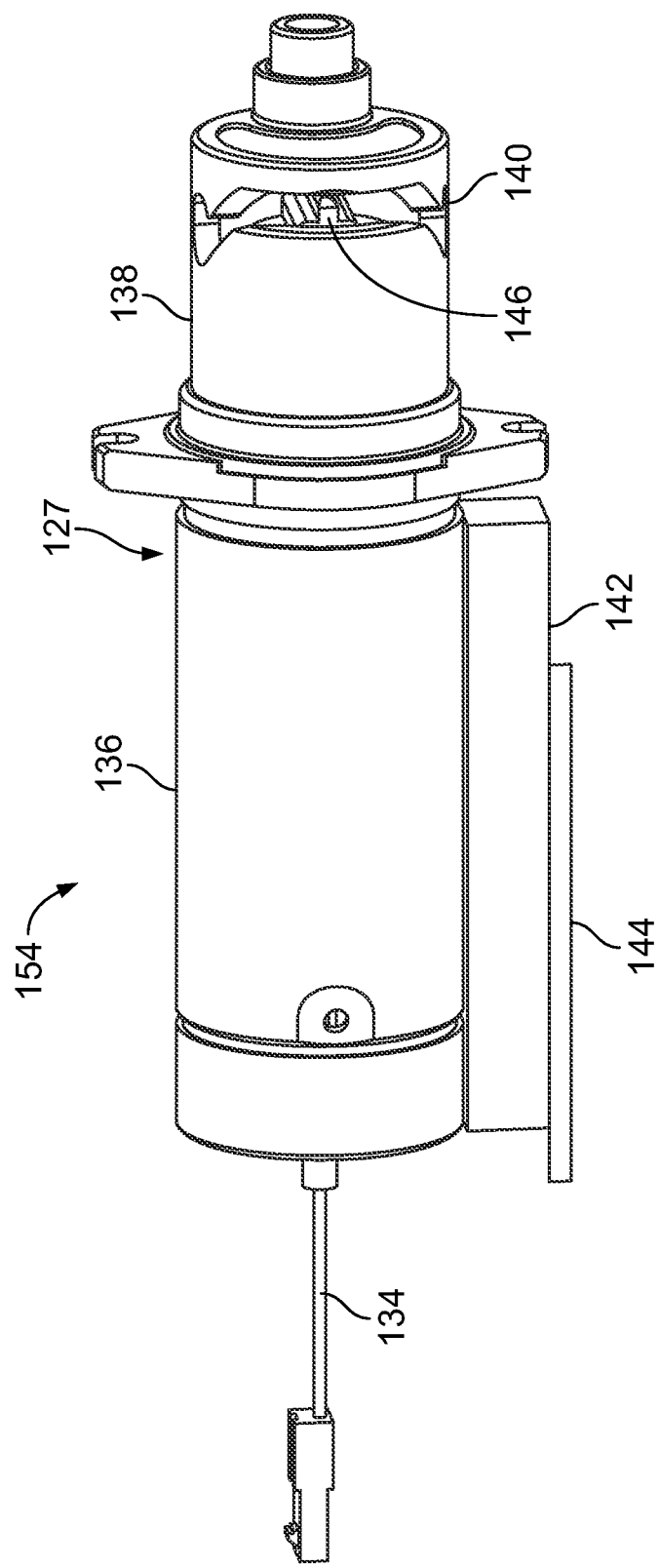
FIG. 21 is a perspective view of an exemplary embodiment of a container support of the system of FIG. 19, according to an aspect of the present disclosure.

In any event, each satellite support 154 includes the combination of a weight scale 142 and a clamp 127, with one exemplary embodiment of a satellite support 154 being shown in greater detail in FIG. 21. The clamp may be variously configured without departing from the scope of the present disclosure, with the illustrated embodiment including a clamp head 138, a clamp solenoid 136, and an electrical output 134. A conduit slot 140 is defined by the clamp head to receive a portion of a conduit associated with a satellite container to be supported by the satellite support.

The clamp is configured to regulate fluid flow through the conduit received by the slot by moving between open and closed conditions, with fluid flow through the conduit received by the slot being allowed when the clamp is in the open condition and prevented when the clamp is in the closed condition. The manner in which the clamp prevents fluid flow through the conduit may vary depending on the configuration of the conduit. For example, in one embodiment, the conduit is configured as a flexible tube, with the clamp including a pinch valve 146 associated with the slot and configured to move between an open condition (allowing fluid flow) and a closed condition in which the pinch valve contacts and occludes the portion of the conduit received by the slot to prevent fluid flow through the conduit. If the conduit is differently configured (e.g., as a rigid tube), the clamp may be differently configured (e.g., as a ball valve) to selectively allow and prevent fluid flow through the conduit. Regardless of the particular configuration of the clamp, the operation of the clamp is automatic (rather than manual), being controlled by the controller of the system. This may include the clamp being controlled in accordance with the foregoing description of the clamp systems of FIGS. 1 and 2, such as being controlled to execute a procedure as illustrated in FIGS. 17, 18A, and 18B and described above.

The weight scale of the satellite support is configured to transmit signals to the system controller that are indicative of the combined weight of the supported satellite container (i.e., the tare weight) and its contents, with the controller using such information to execute a fluid splitting procedure, as described in greater detail above in regard to systems 10 and 50. The weight scale 142 of the satellite support may be variously configured without departing from the scope of the present disclosure, with the weight scale including a load cell in one embodiment. The weight scale shown in FIG. 21 is mounted to a bottom surface of the clamp solenoid, with at least a portion of the weight scale being positioned between the clamp solenoid and a mount plate 144, which is provided for attaching the satellite support to the system (e.g., to the lower support frame, as in FIGS. 19 and 20). In an alternative embodiment, rather than being separate from the clamp, the weight scale may instead be integrated into the clamp.

In one embodiment, the weight scale measures deflection of the clamp, which is indicative of the combined weight of the supported satellite container and the contents of the container. In such an embodiment, the weight scale may be configured to measure the combined weight of the supported container and the contents of the container only when the associated clamp is in the closed condition. When the clamp is in the closed condition, there will be no flow into the satellite container, such that the combined weight may be more accurately determined. Additionally, when the clamp is in the closed condition, it is more actively supporting the container (compared to the support provided when the clamp is open), causing (typically slight) deflection of the clamp with respect to the remainder of the system that is measured by the load cell.

The weight scales (of the source support and the satellite support(s)) and the clamps communicate with the controller of the system, as discussed above with respect to systems 10 and 50. The controller may be incorporated into the system 100, such as in the base, central column, upper support frame and lower support frame or may instead be incorporated into a separate component, such as a computer that is associated with the weight scales and the clamps by a wired or wireless connection.

The system 100 may also include at least one indicator 110 associated with the controller. The indicator 110 may be incorporated anywhere into the system without departing from the scope of the present disclosure, but is associated with an upper surface of the upper support frame in the illustrated embodiment. The indicator is configured to display at least one of an indication of a status of the system, which may include (for example) when the system is ready to begin processing, when the system is processing, when the system has completed processing, and when there has been an error. The indicator may display or represent the status of the fluid-splitting system in any suitable manner. For example, in one embodiment, an indicator may be configured as a light that is configured to display a different color at each stage, and it may include blinking to indicate the state of the fluid-splitting system. The indicator may utilize any other type of indication known in the art without departing from the scope of the present disclosure, which may include an indicator being configured as a video screen and/or an audio system, for example. It should be understood that similar indicators may be incorporated into the other systems described herein.

The system 100 can also include buttons or icons associated with the controller. The buttons or icons may be variously configured and positioned at any suitable location of the system, with the illustrated embodiment showing a pair buttons or icons on one of the outwardly facing surfaces of the upper support frame. As illustrated in FIGS. 19 and 20, the system may include two buttons or icons 111 and 113. One button/icon may be a start button/icon for initializing a splitting procedure and the other button/icon of the set may be a stop button/icon for stopping a splitting procedure. The stop button/icon may be particularly useful in the event of an erroneous splitting session. It should be understood that similar buttons or icons may be incorporated into the other systems described herein.

The manner in which fluid is conveyed from one container to another container may vary without departing from the scope of the present disclosure. In the illustrated embodiment, the source container is positioned at a greater elevation than the satellite container(s), which allows for fluid flow from the source container to the satellite container(s) via gravity. In another embodiment, the system may include a pump system configured to convey fluid from one container to another container. The pump system (if provided) may be variously configured without departing from the scope of the present disclosure.

As noted above, any of the previously described fluid splitting processes may be executed using system 100, with the controller receiving information from the various weight scales and using that information to control operation of the various clamps. Indeed, the principle differences between a fluid splitting procedure using the system 100 of FIGS. 19 and 20 and a system of the type shown in FIGS. 1 and 2 are the manners in which the satellite containers are supported and weighed, rather than the way in which the various components of the systems are actuated by their controllers to split a high volume fluid.

Regardless of how fluid is conveyed from one container to another container, once the proper amounts of fluid are in each container, the controller(s) may actuate a sealing system (if provided), as discussed above.

While the system 100 illustrated in FIGS. 19 and 20 is particularly well-suited for separation of a high volume fluid into three parts, it should be understood that the system may also be used to separate a fluid into only two parts (using, for example, a fluid flow circuit similar to the one shown in FIG. 1). When separating a fluid into only two parts, one of the satellite supports would remain empty, while its weight scale and clamp and (if provided) the pump and sealing systems configured to cooperate with a conduit connected to a second satellite container would remain inactive. Fluid splitting would then proceed, with fluid being conveyed from one of the containers (typically the source container) into the other (typically the single satellite container). If it would be desirable to split a high volume fluid into more than three parts, a system having additional satellite supports may be provided, with a fluid splitting procedure proceeding according to the principles described herein.

The system 100 is shown as a standalone device, but it should be understood that it may be incorporated into a larger assembly or otherwise paired with another fluid processing device, as with the systems of 10 and 50. FIGS. 22 and 23 illustrate an exemplary station 200 embodying this concept, with FIGS. 22 and 23 showing a station 200 with a plurality of systems that are each configured for splitting a high volume fluid into two or more amounts. The station 200 may itself, in turn, be incorporated into a larger assembly or otherwise paired with another fluid processing device without departing from the scope of the present disclosure.

More particularly, the illustrated station 200 includes a base 202 and central column 208 extending upwardly from the base 202. The central column may be fixedly secured or integrally formed with the base or may instead be rotatably associated to the base. If the central column 208 is rotatably associated with the base 202, the station may utilize a drive system associated with a controller of the station that is configured to rotate the central column with respect to the base. While FIGS. 22 and 23 illustrate a substantially circular base 202 and a substantially cylindrical central column 208, it should be understood that the base and central column may be variously configured without departing from the scope of the present disclosure. The sizes and shapes of the base 202 and central column 208 may depend on the configurations of the fluid flow circuits to be accommodated by the station 200, with larger fluid flow circuits requiring a taller central column 208 than smaller fluid flow circuits, for example. Depending on the size and configuration of the fluid flow circuits to be accommodated by the station 200, the base 202 may be configured to be positioned on a floor or on some other support surface (e.g., a table or countertop). In one embodiment, the base 202 may include wheels or rollers or casters or the like for moving the station 200 from one location of a floor or support surface to another.

The station 200 additionally includes a lower support frame 204 and upper support frame 206, both extending outwardly from the central column 208. In the illustrated embodiment, the upper support frame and the lower support frame are generally square platforms with four outwardly facing surfaces joined by rounded corners, which configuration is well-suited for accommodating up to four fluid flow circuits (as will be described in greater detail herein). However, it should be understood that the configurations of the upper and lower support frames 204 and 206 may vary without departing from the scope of the present disclosure.

FIG. 23 illustrates four separate fluid flow circuits mounted to the station 200, with three of the fluid flow circuits being identified in FIG. 23 as 258a, 258b and 258c. In the illustrated embodiment, the four fluid flow circuits are substantially identically configured, though it is within the scope of the present disclosure for differently configured fluid flow circuits to be accommodated by a single station 200. While four separate fluid flow circuits are depicted in FIG. 23, it should be understood that the illustrated station 200 may be used with between one and four circuits.

The station includes a plurality of systems for splitting a fluid, each configured to accommodate a different one of the fluid flow circuits. In the illustrated embodiment, the station includes four fluid-splitting systems, each spaced 90° from the adjacent systems about the central column 208. Although FIGS. 22 and 23 illustrate four systems for splitting a fluid, stations according to this aspect of the present disclosure may include any number of two or more systems for splitting a fluid.

The individual fluid-splitting systems of the station 200 may be variously configured without departing from the scope of the present disclosure. The systems incorporated into the station 200 of FIGS. 22 and 23 are shown as being similarly configured to the system 50 of FIG. 2, but an individual fluid-splitting system may instead be configured similarly to system 100 of FIGS. 19 and 20 (for example) or otherwise configured in accordance with the principles described herein. Indeed, unless noted, the features and operation of systems 10, 50, and 100 from the foregoing description are also applicable to the individual fluid-splitting systems of the station 200 of FIGS. 22 and 23. It should also be understood that, while the fluid-splitting systems shown in FIGS. 22 and 23 are particularly well-suited for splitting a high volume fluid into two or three parts, the individual systems are not limited to splitting of a high volume fluid into any particular number of parts, but rather a fluid may be split into two or more parts. Additionally, it should be understood that, while all of the fluid-splitting systems of the illustrated station 200 are substantially identical, it is within the scope of the present disclosure for at least two of the fluid-splitting systems of a station to be differently configured (e.g., configured to split fluids into different numbers of parts and/or to accommodate differently configured fluid flow circuits).

While this aspect of the present disclosure is not limited to a particularly configured fluid-splitting system, in general, each fluid-splitting system of the station 200 includes a source support, with the three visible source supports being identified in FIGS. 22 and 23 at 214a, 214b, and 214c. Each source support is configured to support a source container (identified in FIG. 23 at 216a, 216b, and 216c) of the associated fluid flow circuit. Although FIGS. 22 and 23 illustrate identical source supports, it should be understood that at least two source supports of a single station may be differently configured from each other.

Each fluid-splitting system further includes at least one satellite support, with each fluid-splitting system of the illustrated embodiment having two satellite supports. The two satellite supports associated with source support 214a are identified in FIGS. 22 and 23 at 220a and 256a, the two satellite supports associated with source support 214b are identified in FIGS. 22 and 23 at 220b and 256b, and the two satellite supports associated with source support 214c are identified in FIGS. 22 and 23 at 220c and 256c. A fourth pair of satellite supports are associated with the fourth source support. Each satellite support is configured to support a satellite container of the fluid flow circuit mounted to the fluid-splitting system of which the satellite support is a component. The satellite supports may be similarly configured to the source supports or may be differently configured. Similarly, the satellite containers may be similarly configured to the source containers or may be differently configured. Although FIGS. 22 and 23 depict two satellite supports per source support, it is within the scope of the present disclosure for a fluid-splitting system to include a single satellite support or more than two satellite supports.

In the illustrated embodiment, all of the source and satellite supports are associated with the upper support frame, with each extending from a lower surface of the upper support frame and with the source support of each fluid-splitting system being positioned between the associated first and second satellite supports. The supports of each fluid-splitting system are shown as being positioned near a different face of the upper support frame, which may be advantageous in distancing the systems from each other in order to prevent the conduits of different fluid flow circuits from becoming tangled. It should be understood that the illustrated embodiment is merely exemplary and that the supports of any individual fluid-splitting system of a station may be differently positioned without departing from the scope of the present disclosure. For example, it is contemplated that a support (more preferably a satellite support than a source support) may be associated with the lower support frame, rather than the upper support frame, which would be advantageous for a fluid-splitting system configured as shown in FIGS. 19 and 20.

The fluid-splitting systems of FIGS. 22 and 23 are illustrated with supports that are fixed in position with respect to the station, but it should be understood that a station according to the present disclosure may include a system with at least one support having a position that is adjustable with respect to the station, as disclosed in the previous embodiments of the current disclosure. Additionally (or alternatively), the container support may be configured for replacement by a differently configured container support (e.g., by replacing a hook with a ring or a clamp), which also increases the flexibility and utility of the system by allowing for a variety of differently configured fluid containers to be used with the station.

In the illustrated embodiment, the two satellite supports of each fluid-splitting system are configured to position the associated satellite containers at different elevations, with each satellite container being positioned at a lower elevation than its associated source container. However, the satellite supports and containers may be otherwise positioned, as described above with regard to the various fluid-splitting systems.

Each support has a weight scale associated with it, which may include each weight scale being positioned within the support frame associated with the corresponding support (i.e., the upper support frame in the illustrated embodiment). The weight scales can be separate from each other, but it should be understood that they may be associated in some manner as parts of a weighting system or assembly. The weight scales may be similarly or differently configured, with each weight scale being configured and operating as a weight scale of the type described above with regard to any of systems 10, 50 and 100 in one embodiment.

Each fluid-splitting system also includes a clamp system, with the clamp system associated with source support 214a being identified in FIG. 22 at 254a, the clamp system associated with source support 214b being identified in FIG. 22 at 254b, and the clamp system associated with source support 214c being identified in FIG. 22 at 254c. A fourth clamp system (which is not visible in FIGS. 22 and 23) is associated with the fourth source support, which is not visible in FIGS. 22 and 23. Each clamp system is illustrated as being associated with a separate outward face of the lower support frame, though it should be understood that a clamp system may be differently incorporated into the station without departing from the scope of the present disclosure. Additionally, while all of the clamp systems are illustrated as being substantially identical, it should be understood that two or more clamp systems of a single station may be differently configured from each other. In one embodiment, each clamp system may be configured and operate in accordance with the clamp systems described above with regard to any of systems 10, 50 and 100.

Using fluid flow circuit 258a as an example, a first satellite container 222a and a second satellite container 262a are fluidly connected to the source container 214a by conduits 264, 228 and 260, which may be configured as in any of the above embodiments along with the associated conduits. Fluid circuits 258b and 258c may be similarly configured with satellite containers 222b, 222c, 262b, and 262c and source containers 214b and 214c.

FIG. 23 illustrates fluid flow circuit 258 mounted to the system 200 with conduits 264, 228 and 260. The conduits are placed into association with the clamp system 254a, with first clamp receiving a portion of conduit 228 and second clamp receiving a portion of conduit 260 when the fluid flow circuit 258a is mounted on the station 200. The other clamp systems may be configured to similarly accommodate the conduits of the fluid flow circuits associated to their respective fluid-splitting systems.

Each clamp system 254a, 254b, and 254c (which may be variously configured without departing from the scope of the present disclosure) is configured to selectively allow and prevent fluid flow between the source container and the satellite container(s) of the fluid flow circuit mounted to the fluid-splitting system of which the clamp system is a component. Although each clamp system depicted in FIGS. 22 and 23 includes first and second clamps, it is also within the scope of the present disclosure for a clamp system to include a single clamp, specifically in embodiments with a single satellite container. The clamps can operate as discussed above in relation to the previous embodiments.

The weight scales and the clamp systems communicate with a controller or controllers. The station 200 may have a single controller associated with all of the fluid-splitting systems or each fluid-splitting system may have a dedicated controller. The controller carries out process control and monitoring functions for the station 200 and/or for each individual system. The controller or controllers can operate in the same manner as those described with regard to systems 10, 50, and/or 100.

The station 200 may also include at least one indicator with the controller(s), which may include a separate indicator associated with each fluid-splitting system. Two indicators 210a and 210b are visible in FIGS. 22 and 23, with two other indicators being provided, but not visible. The indicator(s) may be incorporated anywhere into the station without departing from the scope of the present disclosure, but are associated with an upper surface of the upper support frame in the illustrated embodiment. The indicators may be configured and function as described above with regard to system 100, for example.

The station 200 can also include buttons or icons associated with the controller(s), which may include each fluid-splitting station having similar buttons or icons. The buttons or icons may be variously configured and positioned at any suitable location of the station, with the illustrated embodiment showing a pair buttons or icons associated with each of the four outwardly facing surfaces of the upper support frame. As illustrated in FIGS. 22 and 23, two buttons or icons 211a and 213a can be associated with the fluid-splitting system including source support 214a and two buttons or icons 211b and 213b can be associated with the fluid-splitting system including source support 214b. The buttons or icons may be configured and function as described above with regard to system 100, for example.

The manner in which fluid is conveyed from one container to another container may vary without departing from the scope of the present disclosure and can include any manner described previously (for example), which may include fluid being pumped from one container to another container of the same fluid flow circuit using a pump system (not illustrated). If multiple fluid flow circuits are mounted to the station, fluid flow from the various source containers may be initiated simultaneously or sequentially. This may include a user initiating flow through one fluid flow circuit at a time by pushing the appropriate button/icon, initiating simultaneous flow through multiple fluid flow circuits at the same time by actuating a single button or icon, or initiating sequential flow and splitting by actuating a single button or icon. Regardless of how fluid is conveyed from one container to the other container, once the proper amounts of fluid are in each container, the controller(s) may actuate a sealing system (if provided) to seal one or more conduits of a fluid flow circuit.

Providing a plurality of fluid-splitting systems in a single station has various advantages. For example, when a station is configured as shown in the illustrated embodiment, an operator may quickly and accurately split four high volume platelet products into twelve equal concentration platelet products (e.g., in under five minutes). The operator may efficiently mount several fluid flow circuits to the station by mounting one circuit to a fluid-splitting system of the station, rotating the central column (and support frames) to bring a second adjacent fluid-splitting system into position in front of the operator, loading a second circuit onto the second system, and repeating the process. This may include starting the fluid splitting procedure of one loaded system before loading the next system or loading all of the circuits onto the system before initiating multiple procedures. In one embodiment, the controller may be configured to determine when a procedure has ended and then rotate the appropriate fluid-splitting system into position in front of the operator to allow the operator to unload the circuit and then load another circuit.

Aspects

Aspect 1. A system for splitting a fluid, comprising: a source support configured to support a source container of a fluid flow circuit; a satellite support configured to support a satellite container of the fluid flow circuit fluidly connected to the source container; a weight scale associated with each of the supports; a clamp system; and a controller configured to control each weight scale to measure a combined weight of the container and the contents of the container supported by the support associated with the weight scale, and control the clamp system to selectively allow and prevent fluid flow from the source container to the satellite container based at least in part upon the combined weight measured by each weight scale.

Aspect 2. The system of Aspect 1, wherein the controller is configured to control the clamp system to selectively allow and prevent fluid flow from the source container to the satellite container so as to equate or at least substantially equate the weights of the contents of each container.

Aspect 3. The system of any one of the preceding Aspects, wherein the source support is positioned at a greater elevation than the satellite support.

Aspect 4. The system of any one of the preceding Aspects, configured for fluid flow from the source container to the satellite container via gravity.

Aspect 5. The system of any one of Aspects 1-3, further comprising a pump system, wherein the controller is configured to control the pump system to convey fluid from the source container to the satellite container.

Aspect 6. The system of Aspect 5, wherein the controller is configured to control operation of the clamp system based at least in part upon volumetric flow rate.

Aspect 7. The system of any one of the preceding Aspects, comprising a plurality of satellite supports, each configured to support a different satellite container fluidly connected to the source container and each including an associated weight scale.

Aspect 8. The system of Aspect 7, wherein the source support and each satellite support are positioned at different elevations.

Aspect 9. The system of any one of Aspects 7-8, wherein the controller is configured to determine that fluid flow from the source container to a first satellite container is complete, and control the clamp system to prevent further fluid flow into the first satellite container while allowing fluid flow from the source container to a second satellite container.

Aspect 10. The system of Aspect 9, wherein the controller is configured to control the clamp system to allow fluid flow from the source container to the second satellite container prior to completion of fluid flow from the source container to the first satellite container.

Aspect 11. The system of Aspect 9, wherein the controller is configured to control the clamp system to prevent fluid flow from the source container to the second satellite container until completion of fluid flow from the source container to the first satellite container.

Aspect 12. The system of any one of Aspects 7-8, wherein the controller is configured to control the clamp system to prevent fluid flow into a first satellite container prior to completion of fluid flow from the source container to the first satellite container while allowing fluid flow from the source container to a second satellite container, determine that fluid flow from the source container to the second satellite container is complete, control the clamp system to prevent further fluid flow into the second satellite container while allowing fluid flow from the source container to the first satellite container, determine that fluid flow from the source container to the first satellite container is complete, and control the clamp system to prevent further fluid flow into the first satellite container.

Aspect 13. The system of Aspect 7, configured to complete fluid flow from the source container to a first satellite container and from the source container to a second satellite container at substantially the same time.

Aspect 14. The system of any one of the preceding Aspects, further comprising a sealing system, wherein the controller is configured to control the sealing system to seal a conduit connecting the source container and the satellite container in response to completion of fluid flow from the source container to the satellite container.

Aspect 15. A method of splitting a fluid, comprising: flowing a fluid from a source container of a fluid flow circuit to a satellite container of the fluid flow circuit; measuring a combined weight for each container and the contents of the container; and automatically controlling a clamp system to selectively allow and prevent fluid flow from the source container to the satellite container based at least in part upon the combined weights for each container and the contents of the container.

Aspect 16. The method of Aspect 15, wherein said automatically controlling the clamp system includes equating or at least substantially equating the weights of the contents of each container.

Aspect 17. The method of any one of Aspects 15-16, wherein the source container is positioned at a greater elevation than the satellite container.

Aspect 18. The method of any one of Aspects 15-17, wherein the fluid is flowed from the source container to the satellite container via gravity.

Aspect 19. The method of any one of Aspects 15-17, wherein the fluid is pumped from the source container to the satellite container.

Aspect 20. The method of Aspect 19, wherein automatic control of the clamp system is based at least in part on volumetric pump rate.

Aspect 21. The method of any one of Aspects 15-20, wherein the fluid flow circuit includes a plurality of satellite containers each fluidly connected to the source container.

Aspect 22. The method of Aspect 21, wherein the source container and each satellite container are positioned at different elevations.

Aspect 23. The method of any one of Aspects 21-22, further comprising determining that fluid flow from the source container to a first satellite container is complete, and automatically controlling the clamp system to prevent further fluid flow into the first satellite container while allowing fluid flow from the source container to a second satellite container.

Aspect 24. The method of Aspect 23, further comprising automatically controlling the clamp system to allow fluid flow from the source container to the second satellite container prior to completion of fluid flow from the source container to the first satellite container.

Aspect 25. The method of Aspect 23, further comprising automatically controlling the clamp system to prevent fluid flow from the source container to the second satellite container until completion of fluid flow from the source container to the first satellite container.

Aspect 26. The method of any one of Aspects 21-22, further comprising automatically controlling the clamp system to prevent fluid flow into a first satellite container prior to completion of fluid flow from the source container to the first satellite container while allowing fluid flow from the source container to a second satellite container, determining that fluid flow from the source container to the second satellite container is complete, automatically controlling the clamp system to prevent further fluid flow into the second satellite container while allowing fluid flow from the source container to the first satellite container, determining that fluid flow from the source container to the first satellite container is complete, and automatically controlling the clamp system to prevent further fluid flow into the first satellite container.

Aspect 27. The method of Aspect 21, further comprising completing fluid flow from the source container to a first satellite container and from the source container to a second satellite container at substantially the same time.

Aspect 28. The method of any one of Aspects 15-27, further comprising sealing a conduit connecting the source container and the satellite container in response to completion of fluid flow from the source container to the satellite container.

Aspect 29. A system for supporting a fluid container, comprising: a frame; a container support member configured to engage and support a fluid container;

and a position adjustment assembly, wherein the position adjustment assembly associates the container support member to the frame, and the position adjustment assembly is configured to allow for adjustment of a position of the container support member with respect to the frame.

Aspect 30. The system of Aspect 29, wherein the position adjustment assembly includes a mechanically actuatable adjustment mechanism.

Aspect 31. The system of Aspect 29, wherein the position adjustment assembly includes an electromechanically actuatable adjustment mechanism.

Aspect 32. The system of any one of Aspects 29-31, wherein the adjustment mechanism comprises a screw.

Aspect 33. The system of any one of Aspects 29-31, wherein the adjustment mechanism comprises a wheel and an axle.

Aspect 34. The system of any one of Aspects 29-31, wherein the adjustment mechanism comprises a cam.

Aspect 35. The system of Aspect 29, wherein the position adjustment assembly includes a hydraulic cylinder.

Aspect 36. The system of Aspect 29, wherein the position adjustment assembly includes a pneumatic cylinder.

Aspect 37. The system of Aspect 29, wherein the position adjustment assembly includes a magnetic linear motor.

Aspect 38. The system of Aspect 29, wherein the position adjustment assembly includes a telescoping linear actuator.

Aspect 39. The system of Aspect 29, wherein the position adjustment assembly includes a piezoelectric member.

Aspect 40. The system of Aspect 29, wherein the position adjustment assembly includes a telescoping rod.

Aspect 41. The system of Aspect 29, wherein the position adjustment assembly includes a rod configured to be replaced by a second rod having a different length.

Aspect 42. The system of any one of Aspects 29-41, wherein the position adjustment assembly is configured to allow for adjustment of a vertical position of the container support member with respect to the frame.

Aspect 43. The system of any one of Aspects 29-39, wherein the position adjustment assembly is configured to allow for adjustment of a horizontal position of the container support member with respect to the frame.

Aspect 44. The system of any one of Aspects 29-43, wherein the container support member is configured to be replaced with a differently configured container support member.

Aspect 45. A system for supporting a fluid container, comprising: a source support configured to support a source container of a fluid flow circuit; at least one satellite support, wherein each satellite support is configured to support a different satellite container of the fluid flow circuit fluidly connected to the source container; a weight scale associated with each of the supports; a clamp system; and a controller configured to control each weight scale to measure an initial combined weight of the container and the contents of the container supported by the support associated with the weight scale; assign a target weight, based at least in part on the combined weights, to each container; for each satellite container, control the clamp system to allow fluid flow from the source container to the satellite container until a current combined weight measured by the weight scale associated with the satellite support supporting the satellite container is less than and within a predetermined percentage of the target weight for the satellite container; for each satellite container, control the clamp system to prevent fluid flow from the source container to the satellite container when the current combined weight measured by the weight scale associated with the satellite support supporting the satellite container is less than and within a predetermined percentage of the target weight for the satellite container; for each satellite container, determine a fluid flow rate of fluid from the source container to the satellite container upon the clamp system being controlled to allow fluid flow from the source container to the satellite container, and a time to allow fluid flow from the source container to the satellite container based at least in part on the fluid flow rate and a lag time of the clamp system; and for each satellite container, control the clamp system to allow fluid flow from the source container to the satellite container for said time and then control the clamp system to prevent fluid flow from the source container to the satellite container so as to arrive within a predetermined amount of the target weight for the satellite container.

Aspect 46. The system of Aspect 45, wherein the controller is configured to, for each satellite container, apply a buffer value when determining when to control the clamp system to prevent fluid flow from the source container to the satellite container to prevent the current combined weight measured by the weight scale associated with the satellite support supporting the satellite container from exceeding said predetermined percentage of the target weight for the satellite container.

Aspect 47. The system of Aspect 46, wherein the controller is configured to, for each satellite container, compare the sum of the current combined weight measured by the weight scale associated with the satellite support supporting the satellite container and the buffer value to the target weight for the satellite container multiplied by said predetermined percentage.

Aspect 48. The system of any one of Aspects 45-47, wherein the controller is configured to verify that the target weight for each container has been achieved upon verifying that the current combined weight measured by the weight scale associated with the source support is no more than the difference of the target weight for the source container and said predetermined amount, and for each satellite container, the current combined weight measured by the weight scale associated with the satellite support supporting the satellite container is no less than the difference of the target weight for the satellite container and said predetermined amount.

Aspect 49. The system of any one of Aspects 45-48, wherein the controller is configured to, for each satellite container, compare the lag time of the clamp system to the time to allow fluid flow from the source container to the satellite container, and control the clamp system to prevent fluid flow to the satellite container when the time to allow fluid flow from the source container to the satellite container is less than the lag time of the clamp system.

Aspect 50. The system of any one of Aspects 45-49, wherein the controller is configured to, for each satellite container, execute multiple cycles of determining the fluid flow rate of fluid from the source container to the satellite container upon the clamp system being controlled to allow fluid flow from the source container to the satellite container, determining the time to allow fluid flow from the source container to the satellite container based at least in part on the fluid flow rate and the lag time of the clamp system, and controlling the clamp system to allow fluid flow from the source container to the satellite container for said time and then control the clamp system to prevent fluid flow from the source container to the satellite container so as to arrive within a predetermined amount of the target weight for the satellite container.

Aspect 51. The system of Aspect 50, wherein the controller is configured to calculate an updated fluid flow rate during each of said cycles.

Aspect 52. The system of any one of Aspects 45-51, wherein the fluid flow rate is determined based at least in part on a rate of change of a current combined weight measured by at least one of the weight scales.

Aspect 53. The system of any one of Aspects 45-52, wherein the target weights for each of the containers are equal.

Aspect 54. The system of any one of Aspects 45-52, wherein the target weights for at least two of the containers are different.

Aspect 55. A method of splitting a fluid in a fluid flow circuit including a source container and at least one satellite container fluidly connected to the source container, the method comprising: measuring an initial combined weight for each container and the contents of the container; assigning a target weight, based at least in part on the initial combined weights, to each container; and for each satellite container, allowing fluid flow from the source container to the satellite container until a current combined weight of the satellite container and the contents of the satellite container is less than and within a predetermined percentage of the target weight for the satellite container, preventing fluid flow from the source container to the satellite container when the current combined weight of the satellite container and the contents of the satellite container is less than and within a predetermined percentage of the target weight for the satellite container, determining a fluid flow rate of fluid from the source container to the satellite container upon fluid flow from the source container to the satellite container being allowed and a time to allow fluid flow from the source container to the satellite container based at least in part on the fluid flow rate and a lag time, and allowing fluid flow from the source container to the satellite container for said time and then preventing fluid flow from the source container to the satellite container so as to arrive within a predetermined amount of the target weight for the satellite container.

Aspect 56. The method of Aspect 55 further comprising, for each satellite container, applying a buffer value when determining when to prevent fluid flow from the source container to the satellite container to prevent the current combined weight of the satellite container from exceeding said predetermined percentage of the target weight for the satellite container.

Aspect 57. The method of Aspect 56, further comprising, for each satellite container, comparing the sum of the current combined weight of the satellite container and the buffer value to the target weight for the satellite container multiplied by said predetermined percentage.

Aspect 58. The method of any one of Aspects 55-57, further comprising verifying that the target weight for each container has been achieved upon verifying that the combined weight of the source container is no more than the difference of the target weight for the source container and said predetermined amount, and for each satellite container, the combined weight of the satellite container is no less than the difference of the target weight for the satellite container and said predetermined amount.

Aspect 59. The method of any one of Aspects 55-58, further comprising, for each satellite container, comparing the lag time to the time to allow fluid flow from the source container to the satellite container, and preventing fluid flow to the satellite container when the time to allow fluid flow from the source container to the satellite container is less than the lag time.

Aspect 60. The method of any one of Aspects 55-59, further comprising, for each satellite container, executing multiple cycles of determining the fluid flow rate of fluid from the source container to the satellite container upon fluid flow from the source container to the satellite container being allowed, determining the time to allow fluid flow from the source container to the satellite container based at least in part on the fluid flow rate and the lag time, and allowing fluid flow from the source container to the satellite container for said time and then preventing fluid flow from the source container to the satellite container so as to arrive within a predetermined amount of the target weight for the satellite container.

Aspect 61. The method of Aspect 60, further comprising calculating an updated fluid flow rate during each of said cycles.

Aspect 62. The method of any one of Aspects 55-61, wherein the fluid flow rate is determined based at least in part on a rate of change of a current combined weight of at least one of the containers.

Aspect 63. The method of any one of Aspects 55-62, wherein the target weights for each of the containers are equal.

Aspect 64. The method of any one of Aspects 55-62, wherein the target weights for at least two of the containers are different.

Aspect 65. A system for splitting a fluid, comprising: a source support configured to support a source container of a fluid flow circuit; a source weight scale associated with the source support; a satellite support including a clamp configured to receive a portion of a conduit fluidly connecting a satellite container of the fluid flow circuit to the source container, and a satellite weight scale associated with the clamp; and a controller configured to control each weight scale to measure a combined weight of the container and the contents of the container supported by the support associated with the weight scale, and control the clamp system to selectively allow and prevent fluid flow from the source container to the satellite container based at least in part upon the combined weight measured by each weight scale.

Aspect 66. The system of Aspect 65, wherein the controller is configured to control the clamp to selectively allow and prevent fluid flow from the source container to the satellite container so as to equate or at least substantially equate the weights of the contents of each container.

Aspect 67. The system of any one of Aspects 65-66, wherein the source support is positioned at a greater elevation than the satellite support.

Aspect 68. The system of any one of Aspects 65-67, configured for fluid flow from the source container to the satellite container via gravity.

Aspect 69. The system of any one of Aspects 65-68, further comprising a pump system, wherein the controller is configured to control the pump system to convey fluid from the source container to the satellite container.

Aspect 70. The system of Aspect 69, wherein the controller is configured to control operation of the clamp based at least in part upon volumetric flow rate.

Aspect 71. The system of any one of Aspects 65-70, comprising a plurality of satellite supports, each configured to support a different satellite container fluidly connected to the source container by a different conduit and each including a clamp configured to receive a portion of the conduit of the associated satellite container and a satellite weight scale associated with the clamp.

Aspect 72. The system of Aspect 71, wherein the source support and each satellite support are positioned at different elevations.

Aspect 73. The system of Aspect 71, wherein the satellite supports are positioned at the same elevation.

Aspect 74. The system of any one of Aspects 71-73, wherein the source support is positioned at a greater elevation than the satellite supports.

Aspect 75. The system of any one of Aspects 71-74, configured to complete fluid flow from the source container to a first satellite container and from the source container to a second satellite container at substantially the same time.

Aspect 76. The system of any one of Aspects 71-74, wherein the controller is configured to determine that fluid flow from the source container to the first satellite container is complete, and control the clamp of the satellite support associated with the first satellite container to prevent further fluid flow into the first satellite container while allowing fluid flow from the source container to a second satellite container.

Aspect 77. The system of Aspect 76, wherein the controller is configured to control the clamp of the satellite support associated with the second satellite container to allow fluid flow from the source container to the second satellite container prior to completion of fluid flow from the source container to the first satellite container.

Aspect 78. The system of Aspect 76, wherein the controller is configured to control the clamp of the satellite support associated with the second satellite container to prevent fluid flow from the source container to the second satellite container until completion of fluid flow from the source container to the first satellite container.

Aspect 79. The system of any one of Aspects 71-74, wherein the controller is configured to control the clamp of a first satellite support to prevent fluid flow into a first satellite container prior to completion of fluid flow from the source container to the first satellite container while allowing fluid flow form the source container to a second satellite container, determine that fluid flow from the source container to the second satellite container is complete, control the clamp of a second satellite support to prevent further fluid flow into the second satellite container, control the clamp of the first satellite support to allow fluid flow into the first satellite container, determine that fluid flow from the source container to the first satellite container is complete, and control the clamp of the first satellite support to prevent further fluid flow into the first satellite container.

Aspect 80. The system of any one of Aspects 65-79, further comprising a sealing system, wherein the controller is configured to control the sealing system to seal the conduit fluidly connecting the satellite container to the source container in response to completion of fluid flow from the source container to the satellite container.

Aspect 81. The system of any one of Aspects 65-80, further comprising a start button or icon and a stop button or icon associated with the controller and configured to provide commands to the controller.

Aspect 82. The system of any one of Aspects 65-81, further comprising an indicator associated with the controller and configured to display an indication at least one system state.

Aspect 83. The system of Aspect 82, wherein the indicator is configured to display at least one of an indication of when the system is ready to begin processing, when the system is processing, when the system has completed processing, and when there has been an error.

Aspect 84. The system of any one of Aspects 65-83, wherein the satellite weight scale comprises a load cell mounted to the clamp.

Aspect 85. The system of any one of Aspects 65-83, wherein the satellite weight scale is integrated into the clamp.

Aspect 86. The system of any one of Aspects 65-85, wherein the clamp is movable between an open condition allowing fluid flow from the source container to the satellite container and a closed condition preventing fluid flow from the source container to the satellite container, and the controller is further configured to control the clamp to move to the closed condition before controlling the satellite weight scale to measure the combined weight of the satellite container and the contents of the satellite container.

Aspect 87. A method of splitting a fluid, comprising: flowing a fluid from a source container of a fluid flow circuit to a satellite container of the fluid flow circuit via a conduit received by a clamp of a satellite support; measuring a combined weight for each container and the contents of the container; and automatically controlling the clamp to selectively allow and prevent fluid flow from the source container to the satellite container based at least in part upon the combined weights for each container and the contents of the container, wherein the combined weight for the satellite container and the contents of the satellite container is measured using a satellite weight scale associated with the clamp.

Aspect 88. The method of Aspect 87, wherein said automatically controlling the clamp includes selectively allowing and preventing fluid flow from the source container to the satellite container so as to equate or at least substantially equate the weights of the contents of each container.

Aspect 89. The method of any one of Aspects 87-88, wherein the fluid flows from the source container into the satellite container via a port associated with an upper end of the satellite container.

Aspect 90. The method of any one of Aspects 87-89, wherein the fluid flows from the source container to the satellite container via gravity.

Aspect 91. The method of any one of Aspects 87-89, wherein the fluid is pumped from the source container to the satellite container.

Aspect 92. The method of Aspect 91, wherein the clamp system is controlled based at least in part upon volumetric flow rate.

Aspect 93. The method of any one of Aspects 87-92, wherein the fluid flow circuit includes a plurality of satellite containers each fluidly connected to the source container by a different conduit received by a different clamp, said flowing a fluid from the source container to the satellite container includes flowing fluid from the source container to each satellite container, and said automatically controlling the clamp includes selectively allowing and preventing fluid flow from the source container to each of the satellite containers based at least in part upon the combined weights for each container and the contents of the container.

Aspect 94. The method of Aspect 93, wherein said automatically controlling the clamp includes selectively allowing and preventing fluid flow from the source container to each of the satellite containers so as to complete fluid flow from the source container to a first satellite container and from the source container to a second satellite container at substantially the same time.

Aspect 95. The method of Aspect 93, further comprising determining that fluid flow from the source container to a first satellite container is complete, and automatically controlling the clamp associated with the first satellite container to prevent further fluid flow into the first satellite container while allowing fluid flow from the source container to a second satellite container.

Aspect 96. The method of Aspect 95, further comprising automatically controlling the clamp associated with the second satellite container to allow fluid flow from the source container to the second satellite container prior to completion of fluid flow from the source container to the first satellite container.

Aspect 97. The method of Aspect 95, further comprising automatically controlling the clamp associated with the second satellite container to prevent fluid flow from the source container to the second satellite container until completion of fluid flow from the source container to the first satellite container.

Aspect 98. The method of Aspect 93, further comprising automatically controlling the clamp associated with a first satellite container to prevent fluid flow into the first satellite container prior to completion of fluid flow from the source container to the first satellite container while allowing fluid flow from the source container to a second satellite container, determining that fluid flow from the source container to the second satellite container is complete, automatically controlling the clamp associated with the second satellite container to prevent further fluid flow into the second satellite container, automatically controlling the clamp associated with the first satellite container to allow fluid flow into the first satellite container, determining that fluid flow from the source container to the first satellite container is complete, and automatically controlling the clamp associated with the first satellite container to prevent further fluid flow into the first satellite container.

Aspect 99. The method of any one of Aspects 87-98, further comprising sealing the conduit in response to completion of fluid flow from the source container to the satellite container.

Aspect 100. The method of any one of Aspects 87-99, wherein said measuring a combined weight for each container and the contents of the container includes moving the clamp to a closed condition preventing fluid flow from the source container to the satellite container before measuring the combined weight of the satellite container and the contents of the satellite container.

Aspect 101. A container support for supporting a container including a conduit, the container support comprising: a weight scale; and a clamp configured to receive a portion of a conduit and movable between an open condition allowing fluid flow through the conduit and a closed condition in which the conduit is occluded, wherein the weight scale is configured to measure a deflection of the clamp when the clamp is in the closed condition to measure a combined weight of the container and the contents of the container.

Aspect 102. The container support of Aspect 101, wherein the weight scale comprises a load cell.

Aspect 103. The container support of any one of Aspects 101-102, wherein the weight scale is integrated into the clamp.

Aspect 104. The container support of any one of Aspects 101-102, wherein the weight scale is mounted to the clamp.

Aspect 105. The container support of Aspect 104, wherein the clamp includes a clamp head and a clamp solenoid, and the weight scale is mounted to the clamp solenoid.

Aspect 106. The container support of Aspect 105, wherein the weight scale is mounted to a bottom surface of the clamp solenoid.

Aspect 107. The container support of any one of Aspects 105-106, further comprising a mount plate, wherein the at least a portion of the weight scale is positioned between the clamp solenoid and the mount plate.

Aspect 108. The container support of any one of Aspects 101-107, wherein the clamp includes a slot configured to receive said portion of a conduit and a pinch valve movable between said open condition to allow fluid flow through the conduit and said closed condition to contact and occlude said portion of the conduit.

Aspect 109. A fluid-splitting station, comprising: a base; a central column extending upwardly from the base; a lower support frame extending outwardly from the central column; an upper support frame extending outwardly from the central column; a plurality of systems for splitting a fluid, each system configured to accommodate a different fluid flow circuit and comprising: a source support associated with the upper support frame and configured to support a source container of the associated fluid flow circuit; a satellite support associated with the upper support frame and configured to support a satellite container of the associated fluid flow circuit fluidly connected to the source container of the associated fluid flow circuit; a weight scale associated with each of the supports; a clamp system associated with the lower support frame; and a controller configured to control each weight scale to measure a combined weight of the container and the contents of the container supported by the support associated with the weight scale, and control the clamp system to selectively allow and prevent fluid flow from the source container to the satellite container based at least in part upon the combined weight measured by each weight scale.

Aspect 110. The station of Aspect 109, wherein each source support is configured to position the associated source container at a greater elevation than the elevation at which the associated satellite support positions the associated satellite container.

Aspect 111. The station of any one of Aspects 109-110, wherein each system includes a plurality of satellite supports, each configured to support a different satellite container fluidly connected to the source container of the associated fluid flow circuit and each including an associated weight scale.

Aspect 112. The station of Aspect 111, wherein the plurality of satellite supports of one of said systems are configured to position the satellite containers of the associated fluid flow circuit at the same elevation.

Aspect 113. The station of any one of Aspects 109-112, further comprising a sealing system, wherein the controller is configured to control the sealing system to seal a conduit connecting one of the source containers and the associated satellite container in response to completion of fluid flow from said one of the source containers to the associated satellite container.

Aspect 114. The station of Aspect 113, wherein each clamp system is configured to receive a portion of the conduit connecting the source container of the associated fluid flow circuit to the associated satellite container, and the sealing system is incorporated into the clamp system.

Aspect 115. The station of any one of Aspects 109-114, further comprising a start button or icon and a stop button or icon associated with the controller and configured to provide commands to the controller.

Aspect 116. The station of Aspect 115, wherein each system includes an associated start button or icon and an associated stop button or icon.

Aspect 117. The station of any one of Aspects 115-116, wherein the start button or icon and the stop button or icon is associated with the upper support frame.

Aspect 118. The station of any one of Aspects 109-117, further comprising an indicator associated with the controller and configured to display an indication of at least one system state.

Aspect 119. The station of Aspect 118, wherein the indicator is configured to display at least one of an indication of when one of the systems is ready to begin processing, when said one of the systems is processing, when said one of the systems has completed processing, and when there has been an error.

Aspect 120. The station of any one of Aspects 118-119, wherein each system includes an associated indicator.

Aspect 121. The station of any one of Aspects 118-120, wherein the indicator is associated with the upper support frame.

Aspect 122. The station of any one of Aspects 109-121, wherein the central column is rotatably associated to the base.

Aspect 123. The station of Aspect 122, further comprising a drive system associated with the controller and configured to rotate the central column with respect to the base.

Aspect 124. The station of any one of Aspects 109-123, wherein each support is associated with a lower surface of the upper support frame.

Aspect 125. The station of any one of Aspects 109-124, wherein the lower support frame is generally square, with four outwardly facing surfaces, and each outwardly facing surface of the lower support frame includes an associated clamp system of a different system.

Aspect 126. The station of any one of Aspects 109-125, wherein each support is configured to position the associated container at a greater elevation than the lower support frame.

Aspect 127. The station of any one of Aspects 109-126, wherein each system includes first and second satellite supports, and the source support of each system is positioned between the associated first and second satellite supports.

Aspect 128. The station of Aspect 127, wherein each clamp system includes first and second clamps, the first clamp is positioned at an angular position between the angular positions of the source support and the first satellite support, and the second clamp is positioned at an angular position between the angular positions of the source support and the second satellite support.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A system for splitting a fluid, comprising:
a source support configured to support a source container of a fluid flow circuit;
a satellite support configured to support a satellite container of the fluid flow circuit fluidly connected to the source container;
a weight scale associated with each of the supports;
a clamp system; and
a controller configured to
control each weight scale to measure a combined weight of the container and the contents of the container supported by the support associated with the weight scale,
assign a target weight to each container, with the target weight for each container being greater than a weight of the container, and
control the clamp system to selectively allow and prevent fluid flow from the source container via gravity to the satellite container based at least in part upon the combined weight measured by each weight scale and the target weights, wherein the system relies solely upon gravity for fluid transfer and does not include a pump system.

2. The system of claim 1, comprising a plurality of satellite supports, each configured to support a different satellite container fluidly connected to the source container and each including an associated weight scale.

3. The system of claim 1, wherein the target weight of each container is based at least in part on the combined weight of the container and the contents of the container.

4. The system of claim 1, wherein the controller is configured to control the clamp system to selectively allow and prevent fluid flow of a fluid from the source container to the satellite container, with the target weight for each container including an amount of the fluid.

5. A system for splitting a fluid, comprising:
a source support configured to support a source container of a fluid flow circuit;
a plurality of satellite supports, each configured to support a different satellite container of the fluid flow circuit fluidly connected to the source container;
a weight scale associated with each of the supports;
a clamp system; and
a controller configured to
control each weight scale to measure an initial combined weight of the container and the contents of the container supported by the support associated with the weight scale,
assign a target weight, based at least in part on the combined weights, to each container,
for each satellite container, control the clamp system to allow fluid flow from the source container to the satellite container until a current combined weight measured by the weight scale associated with the satellite support supporting the satellite container is less than and within a predetermined percentage of the target weight for the satellite container,
for each satellite container, control the clamp system to prevent fluid flow from the source container to the satellite container when the current combined weight measured by the weight scale associated with the satellite support supporting the satellite container is less than and within a predetermined percentage of the target weight for the satellite container, for each satellite container, determine
- a fluid flow rate of fluid from the source container to the satellite container upon the clamp system being controlled to allow fluid flow from the source container to the satellite container, and
- a time to allow fluid flow from the source container to the satellite container based at least in part on the fluid flow rate and a lag time of the clamp system, and for each satellite container, control the clamp system to allow fluid flow from the source container to the satellite container for said time and then control the clamp system to prevent fluid flow from the source container to the satellite container so as to arrive within a predetermined amount of the target weight for the satellite container.

6. The system of claim 5, wherein the controller is configured to, for each satellite container, apply a buffer value when determining when to control the clamp system to prevent fluid flow from the source container to the satellite container to prevent the current combined weight measured by the weight scale associated with the satellite support supporting the satellite container from exceeding said predetermined percentage of the target weight for the satellite container.

7. The system of claim 6, wherein the controller is configured to, for each satellite container, compare the sum of the current combined weight measured by the weight scale associated with the satellite support supporting the satellite container and the buffer value to the target weight for the satellite container multiplied by said predetermined percentage.

8. The system of claim 5, wherein the controller is configured to verify that the target weight for each container has been achieved upon verifying that
- the current combined weight measured by the weight scale associated with the source support is no more than the difference of the target weight for the source container and said predetermined amount, and
- for each satellite container, the current combined weight measured by the weight scale associated with the satellite support supporting the satellite container is no less than the difference of the target weight for the satellite container and said predetermined amount.

9. The system of claim 5, wherein the controller is configured to, for each satellite container,
- compare the lag time of the clamp system to the time to allow fluid flow from the source container to the satellite container, and
- control the clamp system to prevent fluid flow to the satellite container when the time to allow fluid flow from the source container to the satellite container is less than the lag time of the clamp system.

10. The system of claim 5, wherein the controller is configured to, for each satellite container, execute multiple cycles of
- determining the fluid flow rate of fluid from the source container to the satellite container upon the clamp system being controlled to allow fluid flow from the source container to the satellite container,
- determining the time to allow fluid flow from the source container to the satellite container based at least in part on the fluid flow rate and the lag time of the clamp system, and
- controlling the clamp system to allow fluid flow from the source container to the satellite container for said time and then control the clamp system to prevent fluid flow from the source container to the satellite container so as to arrive within a predetermined amount of the target weight for the satellite container.

11. The system of claim 10, wherein the controller is configured to calculate an updated fluid flow rate during each of said cycles.

12. The system of claim 5, wherein the fluid flow rate is determined based at least in part on a rate of change of a current combined weight measured by at least one of the weight scales.

13. The system of claim 5, wherein the target weights for each of the containers are equal.

14. The system of claim 5, wherein the target weights for at least two of the containers are different.

* * * * *